US008018117B2

(12) United States Patent
Makansi

(10) Patent No.: US 8,018,117 B2
(45) Date of Patent: *Sep. 13, 2011

(54) CLOSELY SPACED ELECTRODES WITH A UNIFORM GAP

(75) Inventor: Tarek Makansi, Tucson, AZ (US)

(73) Assignee: Tempronics, Inc., Tucson, AZ (US)

( * ) Notice: Subject to any disclaimer, the term of this patent is extended or adjusted under 35 U.S.C. 154(b) by 430 days.

This patent is subject to a terminal disclaimer.

(21) Appl. No.: 12/302,782

(22) PCT Filed: Jan. 22, 2007

(86) PCT No.: PCT/US2007/060871
§ 371 (c)(1),
(2), (4) Date: Nov. 26, 2008

(87) PCT Pub. No.: WO2007/100941
PCT Pub. Date: Sep. 7, 2007

(65) Prior Publication Data
US 2009/0229648 A1 Sep. 17, 2009

Related U.S. Application Data

(63) Continuation-in-part of application No. 11/344,622, filed on Jan. 31, 2006, now Pat. No. 7,456,543.

(60) Provisional application No. 60/841,262, filed on Aug. 30, 2006.

(51) Int. Cl.
*H02N 3/00* (2006.01)
*F25B 21/02* (2006.01)

(52) U.S. Cl. ........ 310/306; 136/205; 136/253; 136/243; 62/3.1

(58) Field of Classification Search ................... 310/306; 62/3.1, 3.2; 136/205, 243, 253, 254
See application file for complete search history.

(56) References Cited

U.S. PATENT DOCUMENTS 4,343,993 A 8/1982 Binnig et al.
(Continued)

FOREIGN PATENT DOCUMENTS

EP 40 10 909 10/1991
(Continued)

OTHER PUBLICATIONS

European Supplementary Search Report, issued Oct. 22, 2010, Appln. No. 077814511.7-2208/2057659, PCT/US2007077042 (8 pgs).

(Continued)

*Primary Examiner* — Karl Tamai
(74) *Attorney, Agent, or Firm* — Hayes Soloway P.C.

(57) ABSTRACT

An improved design for maintaining separation between electrodes in tunneling, diode, thermionic, thermophotovoltaic and other devices is disclosed. At least one electrode is made from flexible material. A magnetic field is present to combine with the current flowing in the flexible electrode and generate a force that counterbalances the electrostatic force or other attracting forces between the electrodes. The balancing of forces allows separation and parallelism between the electrodes to be maintained at a very small spacing without requiring the use of multiple control systems, actuators, or other manipulating means, or spacers. The shape of one or both electrodes is designed to maintain a constant separation over the entire overlapping area of the electrodes. The end result is an electronic device that maintains two closely spaced parallel electrodes in stable equilibrium with a uniform gap therebetween over a large area in a simple configuration for simplified manufacturability and use to convert heat to electricity or electricity to cooling.

32 Claims, 14 Drawing Sheets

U.S. PATENT DOCUMENTS

| | | | |
|---|---|---|---|
| 5,541,464 A * | 7/1996 | Johnson et al. | 310/306 |
| 6,064,137 A | 5/2000 | Cox | |
| 6,494,048 B1 | 12/2002 | Ghoshal et al. | 62/3.7 |
| 6,651,760 B2 | 11/2003 | Cox et al. | |
| 6,720,704 B1 | 4/2004 | Tavkhelidze et al. | |
| 6,774,003 B2 | 8/2004 | Tavkhelidze et al. | |
| 6,876,123 B2 | 4/2005 | Martinovsky et al. | |
| 6,884,732 B2 | 4/2005 | Najafi et al. | 438/713 |
| 6,946,596 B2 | 9/2005 | Kucherov et al. | |
| 7,005,381 B1 | 2/2006 | Cox et al. | |
| 7,140,102 B2 | 11/2006 | Taliashvili et al. | |
| 7,253,549 B2 | 8/2007 | Tavkhelidze et al. | |
| 7,305,839 B2 | 12/2007 | Weaver, Jr. | |
| 7,456,543 B2 * | 11/2008 | Makansi | 310/306 |
| 2001/0046749 A1 | 11/2001 | Tavkhelidze et al. | |
| 2002/0170172 A1 | 11/2002 | Tavkhelidze et al. | |
| 2004/0050415 A1 | 3/2004 | Kucherov et al. | |
| 2004/0195934 A1 | 10/2004 | Tanielian | |
| 2005/0050415 A1 | 3/2005 | Anand et al. | |
| 2005/0184603 A1 | 8/2005 | Martsinovsky | |
| 2005/0189871 A1 | 9/2005 | Tavkhelidze et al. | |
| 2006/0000226 A1 | 1/2006 | Weaver, Jr. | |
| 2006/0138896 A1 | 6/2006 | Makansi | |
| 2006/0180829 A1 | 8/2006 | Martsinovsky | |
| 2006/0192196 A1 | 8/2006 | Tavkhelidze et al. | |
| 2006/0207643 A1 | 9/2006 | Weaver, Jr. | |
| 2007/0023077 A1 | 2/2007 | Tanielian | |
| 2007/0033782 A1 | 2/2007 | Taliashvili et al. | |
| 2007/0056623 A1 | 3/2007 | Tavkhelidze et al. | |
| 2007/0069357 A1 | 3/2007 | Weaver et al. | |
| 2007/0137687 A1 | 6/2007 | Tanielian | |
| 2007/0295973 A1 | 12/2007 | Jinbo et al. | 257/88 |
| 2008/0017237 A1 | 1/2008 | Bray et al. | |
| 2008/0042163 A1 | 2/2008 | Weaver, Jr. | |
| 2008/0155981 A1 | 7/2008 | Tanielian | |
| 2009/0205695 A1 * | 8/2009 | Makansi | 136/201 |
| 2009/0229648 A1 * | 9/2009 | Makansi | 136/201 |
| 2009/0322221 A1 * | 12/2009 | Makansi | 313/523 |

FOREIGN PATENT DOCUMENTS

| | | |
|---|---|---|
| EP | 1 612 492 | 4/2006 |
| WO | WO 99/13562 | 3/1999 |

OTHER PUBLICATIONS

"Analysis of Nanometer Vacuum Gap Formation in Thermo-Tunneling Devices", Enikov et al., Nanotechnology 19 (2008), Jan. 31, 2008.

International Search Report and Written Opinion issued in PCT/US07/77042, dated Sep. 5, 2008.

Refrigeration by Combined Tunneling and Thermionic Emission in Vacuum: Use of Nanometer Scale Design, Y. Hishinuma, T.H. Geballe, B.Y. Moyzhes, Applied Physics Letters, vol. 78, No. 17, Apr. 23, 2001, abstract only.

Vacuum Thermionic Refrigeration with a Semiconductor Heterojunction Structure, Y. Hishinuna, T.H. Geballe, B.Y. Moyzhes, Applied Physics Letters, vol. 81, No. 22, Nov. 25, 2002, abstract only.

Design and Characterization of Thin Film Microcoolers, Chris LaBounty, Ali Shakouri, John E. Bowers, Journal of Applied Physics, vol. 89, No. 7, Apr. 1, 2001, abstract only.

Possible Cooling by Resonant Fowler-Nordheim Emission, A.N. Korotkov and K.K. Likharev, Applied Physics Letters, vol. 75, No. 16, Aug. 23, 1999, abstract only.

Thermionic Refrigeration, G.D. Mahan, Journal of Applied Physics, vol. 76, No. 7, Oct. 1, 1994, (abstract only).

Multilayer Thermionic Refrigerator, G.D. Mahan, J.A. Sofao and M. Bartkoiwak, Journal of Applied Physics, vol. 83, No. 9, May 1, 1998, abstract only.

Measurements of Cooling by Room Temperature Thermionic Emission Across a Nanometer Gap, Y. Hishinuma, T.H. Geballe, B.Y. Moyzhes, T.W. Kenny, Journal of Applied Physics, vol. 94, No. 7, Oct. 1, 2003, abstract only.

"Quantum, Cylic, and Particle-Exchange Heat Engines", Humphrey et al., Physica E29, 390-398, 2005.

*Efficiency of Refrigeration using Thermotunneling and Thermionic Emission in a Vacuum: Use of Nanometer Scale Design*, by Y.Hishinuna, T.H. Geballe, B.Y. Moyzhes, and T.W. Kenny, Applied Physics Letters, vol. 78, No. 17, Apr. 23, 2001 (also published/previously cited as Refrigeration by combined tunneling and thermionic emission in vacuum: Use of nanometer scale design), abstract only.

*Micron-gap ThermoPhotoVoltaics (MTPV)*, by R. DiMatteo, P. Greiff, D. Seltzer, D. Meulenberg, E. Brown, E. Carlen, K. Kaiser, S. Finberg, H. Nguyen, J. Azarkevich, P. Baldasaro, J. Beausang, L. Danielson, M. Dashiell, D. DePoy, H. Ehsani, W. Topper, K. Rahner, R. Siergie, Thermophotovoltaic Generation of Electricity Sixth Conference, American Institute of Physics, 2004.

Thermal and electrical properties of Czochralski grown GeSi single crystals, by I. Yonenaga et. al. Journal of Physics and Chemistry of Solids 2001.

"Thermotunneling Based Cooling Systems for High Efficiency Buildings", by Marco Aimi, Mehmet Arik, James Bray, Thomas Gorczyca, Darryl Michael, and Stan Weaver General Electric Global Research Center, DOE Report Identifier DE-FC26-04NT42324, 2007.

"Selective Epitaxial Growth of SiGe on a SOI Substrate by Using Ultra-High-Vacuum Chemical Vapor Deposition", by H. Choi, J. Bae, D. Soh, and S. Hong, Journal of he Korean Physical Society, vol. 48, No. 4, Apr. 2006, pp. 648-652.

"Strain relaxation of SiGe islands on compliant oxide", by H. Yin et. al. Journal of Applied Physics, vol. 91, No. 12, Jun. 15, 2002.

"Complex Thermoelectric Materials", by G.J. Snyder and E. S. Tober, Nature Materials, vol. 7 Feb. 2008.

Substrate-mediated photoinduced chemical reactions on ultrathin metal films, V.P. Zhdanov, B. Kasemo, Department of Applied Physics, Apr. 19, 1999, Surface Science 432 (1999) L599-L603.

Bismuth Telluride ($Bi_2Te_3$) Nanowires: Synthesis by Cyclic Electrodeposition/Stripping, Thinning by Electrooxidation, and Electrical Power Generation, E.J. Menke et al, Langmuir 2006, 22, 10564-10574, Jun. 30, 2006.

Electronic Properties of Bismuth Nanowires, Stephen B. Cronin et al., Dept of Physics, Electrical Engineering and Computer Science, Chemistry and Francis Bitter Magnet Laboratory, Massachusetts Institute of Technology, Cambridge, MA 02139.

International Search Report and Written Opinion, PCT/US09/69959, Mar. 15, 2010 (10 pgs).

Jangidze et al., "Electroplating of conformal electrodes for vacuum nanogap tunnel junction", Tbilisi State University, Chavchavadze Ave. 13, 0179 Tbilisi, Georgia, Nov. 2008, pp. 1-11.

European Supplementary Search Report, issued Oct. 12, 2010, Appln. No. 07756398.9-2208 /198425, PCT/US2007060871, (6 pgs).

International Preliminary Report on Patentability, PCT/US07/07042, Mar. 12, 2009 (5 pgs).

International Search Report and Written Opinion, PCT/US07/60871, Jan. 22, 2007 (6 pgs).

European Communication, issued May 27, 2011, Appln. No. 07 756 398.9-2208 (3 pgs).

European Communication issued Jun. 1, 2011, Appln. No. 07 814 511.7-2208 (3 pgs).

* cited by examiner

CLOSELY SPACED ELECTRODES WITH A UNIFORM GAP

CROSS-REFERENCE TO RELATED APPLICATION

This application is a continuation-in-part of U.S. patent application Ser. No. 11/344,622, now issued U.S. Pat. No. 7,456,543, filed on Jan. 31, 2006. This application further claims the benefit of U.S. Provisional Patent Application No. 60/481,262, filed Aug. 30, 2006 and PCT Application No. PCT/US07/60871, filed Jan. 22, 2007.

The present invention pertains to diode, thermionic, tunneling, thermo-photovoltaic and other devices that are designed to have very small spacing between electrodes and in some cases also require thermal isolation between electrodes. The invention may be applied to thermo-tunneling and thermo-photovoltaic generators and heat pumps, and can be applied to similar systems using thermionic and thermoelectric methods. These thermo-tunneling generators and heat pumps convert thermal energy into electrical energy and can operate in reverse to provide refrigeration. The invention may also be applied to any device that requires close, parallel spacing of two electrodes with a current flowing between them.

The phenomenon of high-energy electron flow from one conductor (emitter) to another conductor (collector) has been used in many electronic devices and for a variety of purposes. For example, vacuum-tube diodes were implemented this way, and the physical phenomenon was called thermionic emission. Because of the limitations imposed by the relatively large physical spacing available, these diodes needed to operate at a very high temperature (greater than 1000 degrees Kelvin). The hot electrode needed to be very hot for the electrons to gain enough energy to travel the large distance to the collector and overcome the high quantum barrier. Nevertheless, the vacuum tube permitted electronic diodes and later amplifiers to be built. Over time, these devices were optimized, by using alkali metals, like cesium, or oxides to coat the electrodes, in an effort to reduce the operating temperature. Although the temperatures for thermionic generation are still much higher than room temperature, this method of power generation has utility for conversion of heat from combustion or from solar concentrators to electricity.

Later, it was discovered that if the emitter and the collector were very close to each other, on the order of atomic distances like 2 to 20 nanometers, then the electrons could flow at much lower temperatures, even at room temperature. At this small spacing, the electron clouds of the atoms of the two electrodes are so close that hot electrons actually flow from the emitter cloud to the collector cloud without physical conduction. This type of current flow when the electron clouds are intersecting, but the electrodes are not physically touching, is called tunneling. The scanning tunneling microscope, for example, uses a pointed, conducting stylus that is brought very close to a conducting surface, and the atomic contours of this surface can be mapped out by plotting the electrical current flow as the stylus is scanned across the surface. U.S. Pat. No. 4,343,993 (Binnig, et al.) teaches such a method applied to scanning tunneling microscopy.

It has been known in the industry that if such atomic separations could be maintained over a large area (one square centimeter, for example), then a significant amount of heat could be converted to electricity by a diode-like device and these devices would have utility as refrigerators or in recovering wasted heat energy from a variety of sources. See *Efficiency of Refrigeration using Thermotunneling and Thermionic Emission in a Vacuum: Use of Nanometer Scale Design*, by Y. Hishinuma, T. H. Geballe, B. Y. Moyzhes, and T. W. Kenny, Applied Physics Letters, Volume 78, No. 17, 23 Apr. 2001; *Vacuum Thermionic Refrigeration with a Semiconductor Heterojunction Structure*, by Y. Hishinuma, T. H. Geballe, B. Y. Moyzhes, Applied Physics Letters, Volume 81, No. 22, 25 Nov. 2002; and *Measurements of Cooling by Room Temperature Thermionic Emission Across a Nanometer Gap*, by Y. Hishinuma, T. H. Geballe, B. Y. Moyzhes, and T. W. Kenny, Journal of Applied Physics, Volume 94, No. 7, 1 Oct. 2003. The spacing between the electrodes must be small enough to allow the "hot" electrons (those electrons with energy above the Fermi level) to flow, but not so close as to allow normal conduction (flow of electrons at or below the Fermi level). There is a workable range of separation distance between 2 and 20 nanometers that allows thousands of watts per square centimeter of conversion from electricity to refrigeration. See *Efficiency of Refrigeration using Thermotunneling and Thermionic Emission in a Vacuum: Use of Nanometer Scale Design*, by Y. Hishinuma, et al. supra. These references also suggest the advantage of a coating or monolayer of an alkali metal, or other material, on the emitting electrode in order to achieve a low work function in the transfer of electrons from one electrode to the other. This coating or monolayer further reduces the operating temperature and increases the efficiency of conversion.

Mahan showed that the theoretical efficiency of a thermionic refrigerator, using electrodes with a work function of 0.7 eV and a cold temperature of 500 K, is higher than 80% of Carnot efficiency. See *Thermionic Refrigeration*, By G. D. Mahan, Journal of Applied Physics, Volume 76, No. 7, 1 Oct. 1994. By analogy a conversion efficiency of the electron tunneling process is expected to also be a high fraction of Carnot efficiency. Carnot efficiency presents an upper bound on the achievable efficiency of thermal energy conversion.

The maintenance of separation of the electrodes at atomic dimensions over a large area has been the single, most significant challenge in building devices that can remove heat from a conductor. The scanning tunneling microscope, for example, requires a special lab environment that is vibration free, and its operation is limited to an area of a few square nanometers. Even very recently, all measurements of cooling in a working apparatus have been limited to an area of a few square nanometers. See *Measurements of Cooling by Room Temperature Thermionic Emission Across a Nanometer Gap*, by Y. Hishinuma, et al.

A separation of electrodes at larger dimensions of about 100 nanometers can support conversion of heat to electricity using thermo-photovoltaic methods. In thermo-photovoltaic systems, photons tunnel across a gap. A heat source causes one photo-emissive electrode to radiate, and if a second photosensitive electrode is spaced much less than the radiation wavelength, then up to ten times the conversion power is possible versus standard photovoltaic systems. The heat source can be concentrated sunlight, fossil fuel burning, or other means. The photo-emissive electrode can be made of tungsten for example. The photosensitive electrode can be made of silicon, selenium, or indium gallium arsenide. For more information on thermo-photovoltaic methods, see *Micron-gap ThermoPhotoVoltaics (MTPV)*, by R. DiMatteo, P. Greiff, D. Seltzer, D. Meulenberg, E. Brown, E. Carlen, K. Kaiser, S. Finberg, H. Nguyen, J. Azarkevich, P. Baldasaro, J. Beausang, L. Danielson, M. Dashiell, D. DePoy, H. Ehsani, W. Topper, K. Rahner, R. Siergie, Thermophotovoltaic Generation of Electricity Sixth Conference, American Institute of Physics, 2004.

Hence, there remains a need for a device, which cost-effectively and efficiently converts heat energy into electrical energy in a package that is convenient to use for both the heat source as input and the electrical circuits needing power as output. Abundant sources of heat, including waste heat, could easily become sources of electricity. Examples where employing such devices would help the environment, save money, or both, include:

(1) Conversion of the sun's heat and light into electricity more cost effectively than photovoltaic devices currently used. Many articles describe the use of high temperature thermionic emission to recycle thermal energy from solar collectors by using such heat conversion devices. See *Thermionic Refrigeration*, By G. D. Mahan, supra; and *Multilayer Thermionic Refrigerator*, By G. D. Mahan, J. A. Sofao and M. Bartkoiwak, Journal of Applied Physics, Volume 83, No. 9, 1 May, 1998. However such conversions could be less costly and more prevalent if tunneling were achieved at naturally occurring temperatures.

(2) Recovery of the heat generated by an internal combustion engine, like that used in automobile, back into useful motion. Some automobiles available today, called hybrid gas-electric automobiles, can use either electrical power or internal combustion to create motion. About 75% of the energy in gasoline is converted to waste heat in today's internal combustion engine. A tunneling conversion device could recover much of that heat energy from the engine of a hybrid automobile and put it into the battery for later use. U.S. Pat. No. 6,651,760 (Cox, et al.) teaches a method of converting the heat from a combustion chamber and storing or converting the energy to motion.

(3) Reducing the need for noxious gases to enter the atmosphere. The more energy-efficient hybrid automobile is a clear example where noxious exhaust gases escaping into the atmosphere can be reduced. A device that converts engine and exhaust heat of the hybrid engine and then stores or produces electricity in the hybrid battery would further increase the efficiency of the hybrid automobile and reduce the need to expel noxious gases. Coolants used in refrigeration are other examples of noxious gases that are necessary to remove heat, and tunneling conversion devices could reduce the need for emission of noxious gases.

(4) Recovery of heat energy at a time when it is available, then storing it as chemical energy in a battery, and then re-using it at a time when it is not available. Tunneling conversion devices could convert the sun's energy to electricity during the day and then store it in a battery. During the night, the stored battery power could be used to produce electricity.

(5) Power generation from geothermal energy. Heat exists in many places on the surface of the earth, and is virtually infinitely abundant deep inside the earth. An efficient tunneling conversion device could tap this supply of energy.

(6) Production of refrigeration by compact, silent and stationary solid state devices, where such a tunneling device could provide cooling for air conditioners or refrigeration to replace the need for bulky pneumatic machinery and compressors.

(7) Power generation from body heat. The human body generates about 100 watts of heat, and this heat can be converted to useful electrical power for handheld products like cell phones, cordless phones, music players, personal digital assistants, and flashlights. A thermal conversion device as presented in this disclosure can generate sufficient power to operate or charge the batteries for these handheld products from heat applied through partial contact with the body.

(8) Electrical power from burning fuel. A wood stove generates tens of thousands of watts of heat. Such a tunneling device could generate one or two kilowatts from that heat which is enough to power a typical home's electric appliances. Similar applications are possible by burning other fuels such as natural gas, coal, and others. Then homes in remote areas may not require connection to the power grid or noisy electrical generators to have modern conveniences.

The challenge in bringing two parallel electrodes together within less than 20.0 nanometer separation gap requires attention to two parameters. One is the surface roughness and the other is the surface flatness. Surface roughness is the deviation from smoothness in a small, local area. Holes and scratches are examples of deviations that affect surface roughness. Surface flatness is the deviation from parallelism over a large area. Warping, bending, creeping are examples of deviations that affect surface flatness.

When two rigid materials are polished flat using the best techniques available today for integrated circuits, the surface flatness is on the order of micrometers over a square centimeter area. Furthermore, heat and other stresses can cause changes in warping and bending over time, presenting a further challenge in maintaining uniform separation once achieved. A polished metal or semiconductor surface using today's techniques can easily achieve a roughness of less than 0.5 nanometers.

The state of the art of a tunneling energy conversion device suffers from one or more of the following limitations: (1) a separation that is too large for tunneling, (2) an area that is too small for significant energy conversion, (3) layers of solid material that cannot be thermally isolated resulting in low conversion efficiency, and (4) a design that is too complex to manufacture cost effectively.

A separation of 10 microns or more has been achieved by many thermionic systems, but these systems only operate at very high temperatures, require a costly design for safety, and are limited to environments where this temperature is achieved.

A separation of about 2.0 to 20.0 nanometers has been achieved by a method taught in U.S. Pat. No. 4,343,993 (Binnig, et al.) in the design of the scanning tunneling microscope, but the effective area was on the order of a few square nanometers. Such area was too small (compared to the desired area of about one square centimeter or more) to allow enough current to flow through, even in the most optimal of materials, to convert significant energy.

The semiconductor industry teaches and employs many methods for controlling physical parameters like film thicknesses that are on the order of several nanometers. Thermoelectric devices are an example of integrated circuits that convert energy with a stack of layered materials. See *Design and Characterization of Thin Film Microcoolers*, by Chris LaBounty, Ali Shakouri, and John E. Bowers, Journal of Applied Physics, Volume 89, No. 7, 1 Apr. 2001. However, these methods all require solid materials to be in contact with each other in layers. The heat flows easily from layer to layer, limiting the temperature difference and the conversion efficiency. Because the two electrodes are in contact, the design is at the mercy of available thermoelectrically sensitive materials, and the energy barrier for the electrons to traverse cannot be arbitrarily configured, as is possible by setting the width of a vacuum gap. The materials having needed properties are exotic and expensive elements like bismuth and telluride. For these reasons, thermoelectric devices are limited to a high cost per watt of cooling power and a low efficiency of about 7 percent.

The art of separating two conductors by about 2.0 to 20.0 nanometers over a square centimeter area has been advanced by the use of an array of feedback control systems that are very precise over these distances. A control system includes a feedback means for measuring the actual separation, comparing that to the desired separation, and then a moving means for bringing the elements either closer or further away in order to maintain the desired separation. The feedback means can measure the capacitance between the two electrodes, which increases as the separation is reduced. The moving means for these dimensions is, in the state of the art, an actuator that produces motion through piezoelectric, magnetostriction, or electrostriction phenomena. U.S. Pat. No. 6,720,704 (Tavkhelidze, et al.) describes such a design that includes shaping one surface using the other and then using feedback control systems to finalize the parallelism prior to use. Because of the elaborate processes involved in shaping one surface against the other and the use of multiple feedback control systems to maintain parallelism, this design approach is a challenge to manufacture at a low cost.

Other methods have been documented in U.S. Pat. No. 6,774,003 (Tavkhelidze, et al.), and US Patent Applications 2002/0170172 (Tavkhelidze, et al.), and 2001/0046749 (Tavkhelidze, et al.) that involve the insertion of a "sacrificial layer" between the electrodes during fabrication. The sacrificial layer is then evaporated to produce a gap between the electrodes that is close to the desired spacing of 2 to 20 nanometers. These three methods are either susceptible to post-fabrication fluctuations due to warping or thermal expansion differences between the electrodes, or require the array of actuators to compensate for these fluctuations.

Another method of achieving and maintaining the desired spacing over time is documented in U.S. Pat. No. 6,876,123 (Martinovsky, et al.) and in US Patent Application No. 2004/0050415 through the use of dielectric spacers that hold the spacing of a flexible electrode much like the way poles hold up a tent. One disadvantage of these dielectric spacers is that they conduct heat from one electrode to the other, reducing the efficiency of the conversion process. Another disadvantage of this method is that the flexible metal electrodes can stretch or deform between the spacers over time in the presence of the large electrostatic forces and migrate slowly toward a spacing that permits conduction rather than tunneling or thermionic emission.

Another method for achieving a desired vacuum spacing between electrodes is reveled in US Patent Application 2004/0195934 wherein small voids are created at the interface of two bonded wafers. These voids are small enough to allow thermo-tunneling of electrons across a gap of a few nanometers. Although these gaps can support thermo-tunneling, unwanted thermal conduction takes place around the gaps, and the uniformity of the electrode spacing is difficult to control.

Yet another method for achieving a thermo-tunneling gap is by having the facing surfaces of two wafers be in contact, then using actuators to pull them apart by a few nanometers, as described in U.S. Patent Application 2006/0000226. Although this method can produce a thermo-tunneling gap, this method suffers from the cost of multiple actuators and the thermal conduction between wafers outside of the gap area.

There remain continuing and difficult challenges in meeting the requirements for achieving and maintaining electrode spacing at less than 20.0 nanometer separation gaps, and in mass-producing low cost thermo-tunneling devices, in spite of efforts to date.

An additional utility for a device that can move electrons across a vacuum gap (in addition to providing cooling directly) is to place this gap on top of the thermoelectric stack. In this combination, the hot side and the cool side of the thermoelectric gap become thermally insulated and hence more efficient. A device with a combination of thermoelectric materials and a vacuum gap can provide cooling or heat conversion via thermoelectric methods, thermo-tunneling methods, thermionic methods, or a combination of these methods.

A need, therefore, exists for an improved design for maintaining vacuum separation between electrodes in tunneling, diode, and other devices that is more efficient and less costly than existing designs. In particular, a need exists for a design having closely spaced electrodes with a uniform vacuum gap. More particularly, a need exists for a design having a pair of electrodes which self-position and self-align at a close spacing gap between them to enable the transfer of electrons across the gap by tunneling, thermionic, or other emission, possibly in combination with thermoelectric elements.

The present disclosure is directed to overcoming the aforementioned and other challenges and disadvantages of the prior art. A device and a process are disclosed that employ electron flow in a manner not contemplated by the prior art. In prior designs the flow of electrons in the tunneling device was used for two purposes: (1) as a thermodynamic fluid to transfer heat from one conductor to another, and (2) to move the converted energy directly to or from a battery or electrical circuit. In the present invention there is provided a device construction and process in which electron flow is also used to generate a restoring force that balances the electrostatic and other attractive forces at a desired separation of the electrodes.

A device and a process are disclosed providing closely spaced electrodes with a uniform gap. More particularly, the disclosure concerns a pair of electrodes which self-position and self-align at a close spacing gap between them to enable the transfer of electrons across the gap by tunneling, thermionic, or other emission, possibly in combination with thermoelectric elements.

The present invention uses a flexible material for one of the electrodes, and includes a magnetic field to counterbalance electrostatic or other attractive forces with magnetostatic repelling forces that naturally and simultaneously act on the flexible electrode to position, align and maintain it in a stable equilibrium position at a desired spacing distance from the other electrode surfaces over a large area, and adapt to continual spatial deviations from flatness in either electrode.

A surface roughness of less than 0.5 nanometer is achieved by polishing the electrodes' facing surfaces before assembly. Polishing techniques are readily available in the industry for achieving less than 0.5 nanometers surface roughness on metals, semiconductors, and other materials.

In order to achieve a separation of less than 20.0 nanometers across a large area of one square centimeter or more, a combination of non-contacting forces are generated to cause the electrode materials to come to rest at the desired spacing. In stable equilibrium conditions, one force that is already present in these diode devices is the electrostatic force between the emitter and collector. As a voltage is applied, opposite charges assemble on each of the electrodes and the presence of these charges results in an attractive force between the electrodes. Although the electrostatic force is considered to be the dominant attractive force in closely spaced electrodes, other attractive forces are also present such as gravity, surface tension, Van der Waals forces, Casimir forces, and static friction.

One aspect of the present invention creates a second equal but opposite force which acts on the flexible electrode to balance the attracting electrostatic force and other attractive forces at all points such that the flexible electrode maintains the desired spacing and alignment. This second force is due to a physical phenomenon wherein a force is created when a current flows in a conductor in the presence of a magnetic field. The force acts in a direction that is perpendicular to the plane defined by the direction of the current flow and the direction of the magnetic field.

The magnetic field can be added to the embodiment of the invention by having a permanent magnet near or within the electrodes. Permanent magnet materials like iron, cobalt, and nickel and their alloys are also metals that are highly conductive, both thermally and electrically. Hence, these magnetic materials are compatible with the thermal and electrical conductivity characteristics of the electrodes. Even if it were desired to use a non-conducting magnetic material to provide the magnetic field, such a magnet may be coated by a conductor or simply have a flat conductor mounted to it in order to construct the emitting electrode.

The temperature of the surface where the permanent magnet is placed can affect its operational parameters as magnetic materials lose their magnetization at the Curie temperature level, which is typically between 600 and 1400 degrees Kelvin. However, in the present invention, the magnet may be placed either on the cool side or the hot side of the conversion device, so configurations can be found to prevent the magnet from reaching its Currie temperature.

The present invention provides a way for electrode materials to be brought together in a new, unobvious manner to produce a simple and inexpensive thermo-tunneling, thermo-photovoltaic, or thermionic device which has the following advantages: (1) simplicity by eliminating the need for actuators and control systems required by the prior art, (2) making use of the technology and manufacturing processes already developed in the electric light bulb and semiconductor industries to achieve low cost and mass production, (3) achieving the narrow spacing gaps between electrodes without the use of spacers so as to permit tunneling of hot electrons from one electrode to the other thereby cooling the first electrode, and (4) maintaining a uniform spacing gap over large electrode areas such as one square centimeter.

Other systems, devices, features and advantages of the disclosed device and process will be or become apparent to one with skill in the art upon examination of the following drawings and detailed description. It is intended that all additional systems, devices, features, and advantages be included within this description, be within the scope of the present invention, and be protected by the accompanying claims.

Many aspects of the disclosed device and process can be better understood with reference to the attached drawings, FIGS. 1-14. The components in the drawings are not necessarily to scale, emphasis instead being placed upon clearly illustrating the principles of the present invention. Moreover, in the drawings, like reference numerals do not need corresponding parts throughout the several views. While exemplary embodiments are disclosed in connection with the drawings, there is no intent to limit the disclosure to the embodiments disclosed herein. On the contrary the intent is to cover all alternatives, modifications and equivalents.

FIG. 9b is a graph, similar to FIG. 5, illustrating interacting forces in the device of FIG. 9a;

Referring more specifically to the drawings in which like reference numerals refer to like elements throughout the several views, exemplary embodiments of the device and process of the present disclosure are illustrated in FIG. 1-14.

In general, a device and a process are disclosed employing facing electrodes and involving two force distributions. A primarily electrostatic attracting force distribution between the electrodes is generated by an electric charge within the electrodes. An equal but opposite repelling force distribution is generated by the electric current distribution within the electrodes combined with an applied magnetic field distribution. The two force distributions act simultaneously to establish a stable equilibrium separation of the electrodes across their facing surfaces.

Figure 1:
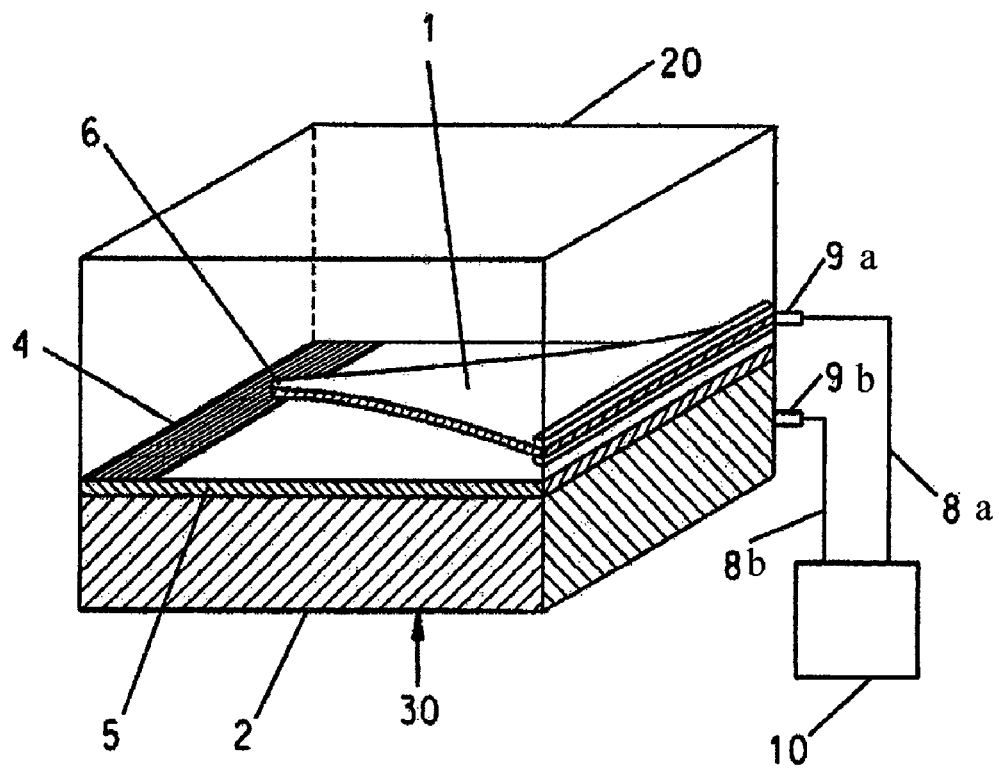
FIG. 1 illustrates one embodiment of the self-positioning electrode device of the present disclosure.

FIG. 1 shows one embodiment of the present disclosure. Electrode 1 is a flexible metal foil or a metal foil mounted on a plastic film or substrate like polyimide. The plastic substrate helps prevent the foil from cracking, creasing, or breaking after repeated motions created by electrostatic and electromagnetic forces. The plastic substrate or electrical properties of electrode 1 can also act to prevent vibration or instability of its motion during equilibration. Electrode 2 is a permanent magnet either made of or coated with a conducting material. In an exemplary form electrode 2 is a rectangular block. Both electrodes are polished on the surfaces facing each other. Heat source 30 is present if the device is used for conversion of thermal energy, or is an object to be cooled if the device is used as a refrigerator. Power supply 10 is present if the device is used as a refrigerator and is additionally an electrical load if the device is used as a thermal conversion generator. Insulating layer 4 is present to allow a non-conducting resting point for tip 6 of electrode 1 when the device is not in operation (i.e., while the device is turned off). Additionally, one of the electrodes can have a coating of a non-conducting material thinner than the desired equilibrium spacing between the electrodes on which another of the electrodes rests when the device is not in operation. Layer or coating 5 on top of electrode 2 is a material designed to have a low work function to facilitate electron tunneling between electrode 2 and electrode 1. Connectors 9a and 9b and wires 8a and 8b complete the circuit. Chamber 20 seals the area between the facing electrodes 1 and 2 with either a vacuum or inert gas to minimize heat transfer from one electrode to the other. Suitable gases include argon and helium. The wider end of flexible electrode 1 is fixedly mounted to a support structure in chamber 20, and electrode 1 comes to rest at tip 6 on the insulating layer or film 4 when the power is off.

Figure 1A:
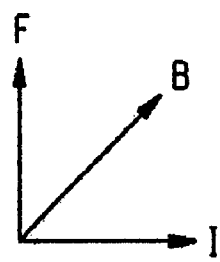
FIG. 1a illustrates the directional status of current, the magnetic field, and the magnetostatic force in the device of FIG. 1.

FIG. 1a indicates the directional status of the current (I) flowing in electrode 1, the magnetic field (B) generated by the presence of the permanent magnet within electrode 2, and the force F resulting from the interaction of I and B. The force F acts in the vertical upwards direction at every point on electrode 1, opposing and balancing the electrostatic attracting force that pulls electrode 1 downwards toward electrode 2.

Figure 1B:
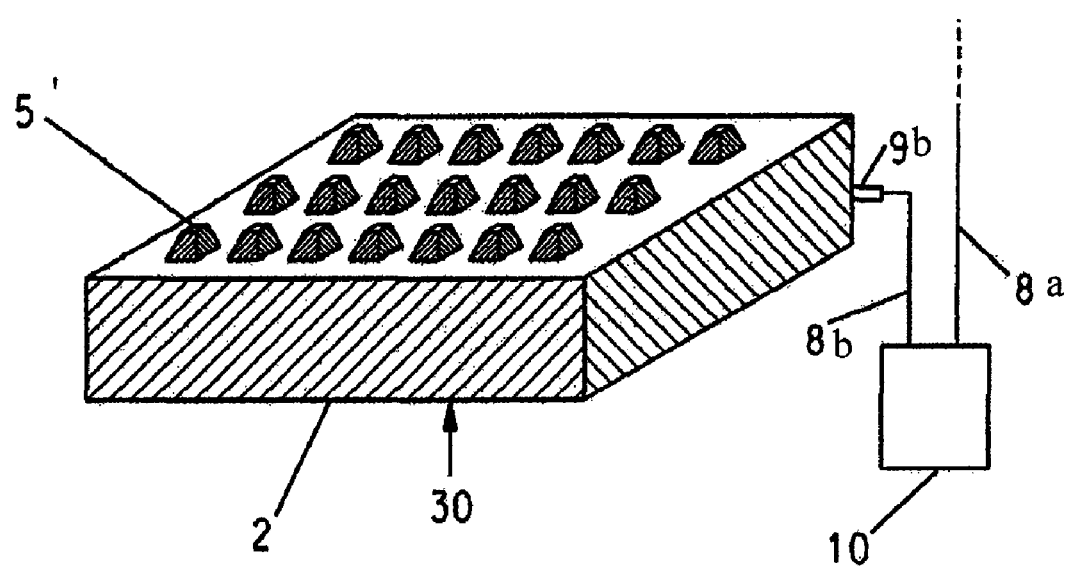
FIG. 1b illustrates an alternate embodiment of electrode 2 in the device of FIG. 1.

FIG. 1b shows an alternative arrangement for electrode 2. Here, the surface of the material is patterned with an array of peaks 5. The geometry of these peaks permits enhancement of electron emission from electrode 2 due to magnified electric fields in the region of the peaks. These peaks may also occur naturally due to intended or unintended roughness of the surface of electrode 2 after polishing.

The device of FIG. 1 may also have additional force generating or altering mechanisms or systems to assist its operation during power-off, equilibrium, or transitioning from power-off to equilibrium or transitioning from equilibrium to power-off. For example, these mechanisms could dampen the system to prevent vibrations or oscillations of electrode 1 around its equilibrium resting position. These additional forces may be created mechanically, magnetically, electromechanically, electromagnetically, or by other ways to offset deficiencies or excesses in the magnitude of the primary electrostatic and magnetic counter-balancing forces.

The material for flexible electrode 1 can be a conductive metal, a semiconductor material, layered glass/metal or layered metal/plastic. Exemplary conductive metals include gold, silver, aluminum, and copper. Exemplary semiconductor materials include silicon, germanium and gallium arsenide. The conductive metal or semiconductor material can optionally be mounted on or combined in layers with a material that adds flexibility to the metal if the metal is not sufficiently flexible by itself, such as glass, polyamide, polyester, polyimide, polyacrylic or polyolefin.

The permanent magnet of electrode 2 can be either contained within or be a part of the electrode. In an exemplary embodiment the permanent magnet can contain conducting ferromagnetic materials in any combination of iron, cobalt, nickel, neodymium or aluminum. Alternatively, the permanent magnet can contain one or more non-conducting ferromagnetic materials coated with a conducting material. Exemplary non-conducting ferromagnetic materials include ferrite, barium ferrite, and iron oxide particles sealed in a binder.

Layer or coating 5 on electrode 2 can be a low work function material, a thermoelectrically sensitive material, a resonant tunneling material, an electric field enhancing texture, or a combination of these. Exemplary embodiments of a low work function material include any layered or other combination of alkali metal, an alloy of alkali metal, an oxide, or diamond such as diamond film, or nanotubes. A collection of peaks and valleys arising from surface roughness or patterning (as, for example, illustrated in FIG. 1b) can enhance the electric field and hence improve electron emission from electrode 2. Finally, a semiconductor layer arranged to achieve resonant tunneling can also improve electron emission. Exemplary semiconductor materials include silicon, germanium and gallium arsenide. Exemplary thermoelectrically sensitive materials include bismuth telluride of various dopings.

The low work function material in layer 5 of FIG. 1 or enhancing material 5' in FIG. 1b can be, for example, cesium (Cs), barium (Ba), strontium (Sr), rubidium (Rb), germanium (Ge), sodium (Na), potassium (K), calcium (Ca), Lithium (Li), and combinations or oxides thereof. Such materials are shown to reduce the work function of the emitting electrode 2 from 4-5 eV down to as low as 1.1 eV or lower. Additional low work function materials include thorium (Th), metal-coated oxides and silicon. Other materials not mentioned here can also achieve low work functions, and the addition of such a layer of material is an obvious extension of the invention. For example, a different type of layer, wide gap semiconductor layer to facilitate electron tunneling is proposed by Korotkov. See *Possible Cooling by Resonant Fowler-Nordheim Emission*, by A. N. Korotkov and K. K. Likharev, Applied Physics Letters, Volume 75, No. 16, 23 Aug. 1999. Therein, a thin oxide layer, whose thickness is controlled carefully, excites the electrons to a resonant condition thereby assisting the hot electrons to escape to the vacuum. Also, layer 5 of FIGS. 1 and 5' of FIG. 1b could be an array of carbon nanotubes or a similar arrangement to maximize emission and minimize work function. Insulating layer 4 materials may include glass, polyimide, or other plastics.

The flow of the electrons in FIG. 1 and the uniqueness of the invention can be described as follows. The free electrons flow from the power supply or electrical load 10 to the emitting electrode 2. The free electrons that are emitted from electrode 2 to electrode 1 are selected by this design to be the hot electrons that can remove heat from electrode 2. One aspect of this invention is that the free electrons flow within electrode 1 from left to right in FIG. 1. in the presence of a magnetic field B directionally shown in FIG. 1a. This free electron flow direction in combination with the applied magnetic field generates a repelling force directionally shown in FIG. 1a that balances the attractive electrostatic force and achieves a constant and desired separation between electrode 1 and electrode 2 over a large area.

Figure 2:
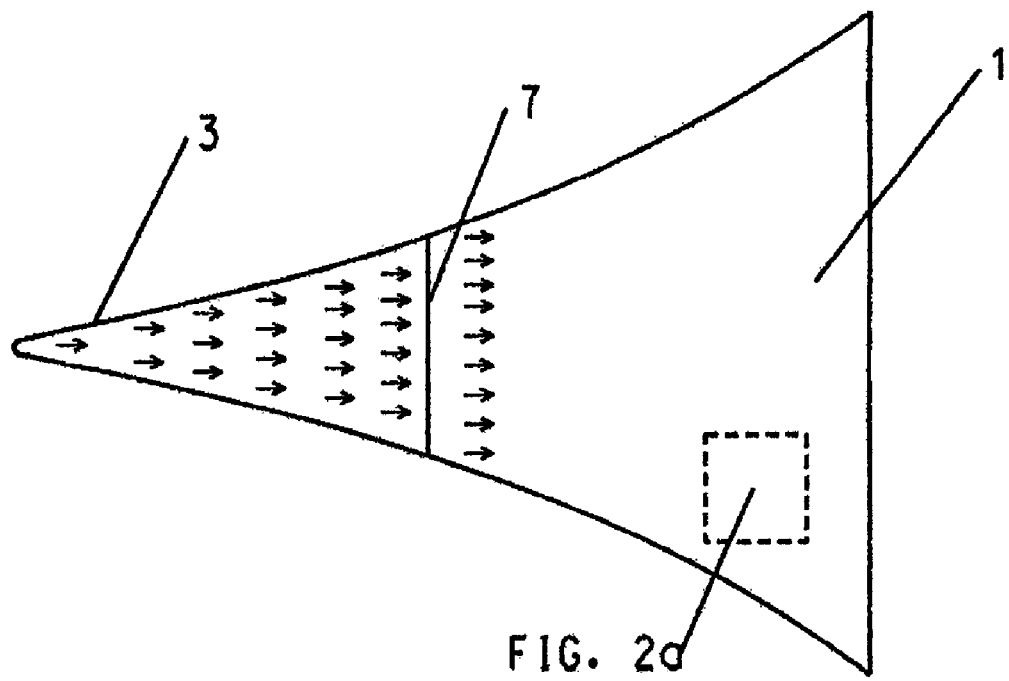
FIG. 2 is a schematic top plane view of electrode 1 of the device of FIG. 1.

FIG. 2 is a schematic of a top view of the exemplary embodiment of electrode 1 in FIG. 1 showing a cross-section 7 with arrows pointing in the direction of electron flow. Cross-section 7 has a current density equal to the aggregate tunneling current that is picked up by all of the electrode's surface to the left of 7 divided by the length of cross-section 7. As the tunneling current is expected to be proportional to the area of tunneling activity to left of 7, then the length of cross-section 7 will optimally increase in proportion to the increase in area of the electrode surface to its left. The border 3 of electrode 1 therefore traces out an exponential function. Thus, the width of the surface of flexible electrode 1 grows exponentially from its tip 6 to its opposite end. An exponential function is mathematically equal to the area bounded by it and the X-axis up to its integration point. The function traced out by border 3 can also compensate for other variations in current density, such as electrical resistance due to path length inside electrode 1. Also, in some cases, the design can be sub-optimized with a triangular shaped electrode 1 for ease of manufacturing.

Figure 2A:
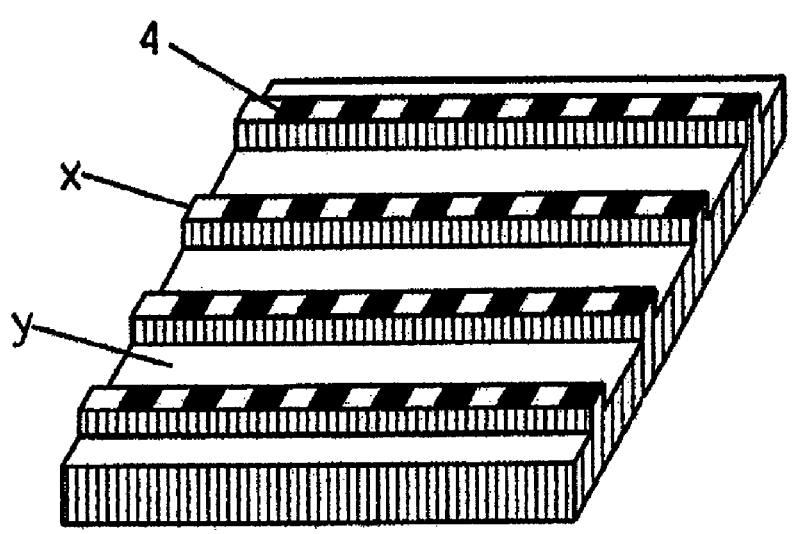
FIG. 2a is a perspective bottom view illustrating a cut out portion of an embodiment of the electrode of FIG. 2.

FIG. 2a is a schematic view of the bottom side of the cut out portion of electrode 1 shown in FIG. 2. It illustrates how electrode 1 may be patterned on its bottom surface, which faces electrode 2. The pattern allows the tunneling area (defined by the total area X of elevated surface x) to be different from the total area Y that is available for current to flow. Patterning electrode 1 in this way allows for larger total area Y and hence lower electrical resistance losses and heat generation losses for the aggregate current to flow. At the same time it minimizes the area that is close to electrode 2, which reduces the electrostatic force that must be overcome to place the electrodes in their desired positions. The same effect of patterning of electrode 1 may also be accomplished by intentional or unintentional surface roughness after polishing. The intermittently elevated segments 4 are thin insulating layers which can support electrode 1 and prevent electrical shorts as the foil material of electrode 1 drapes toward electrode 2 when the device is turned on.

Figure 3:
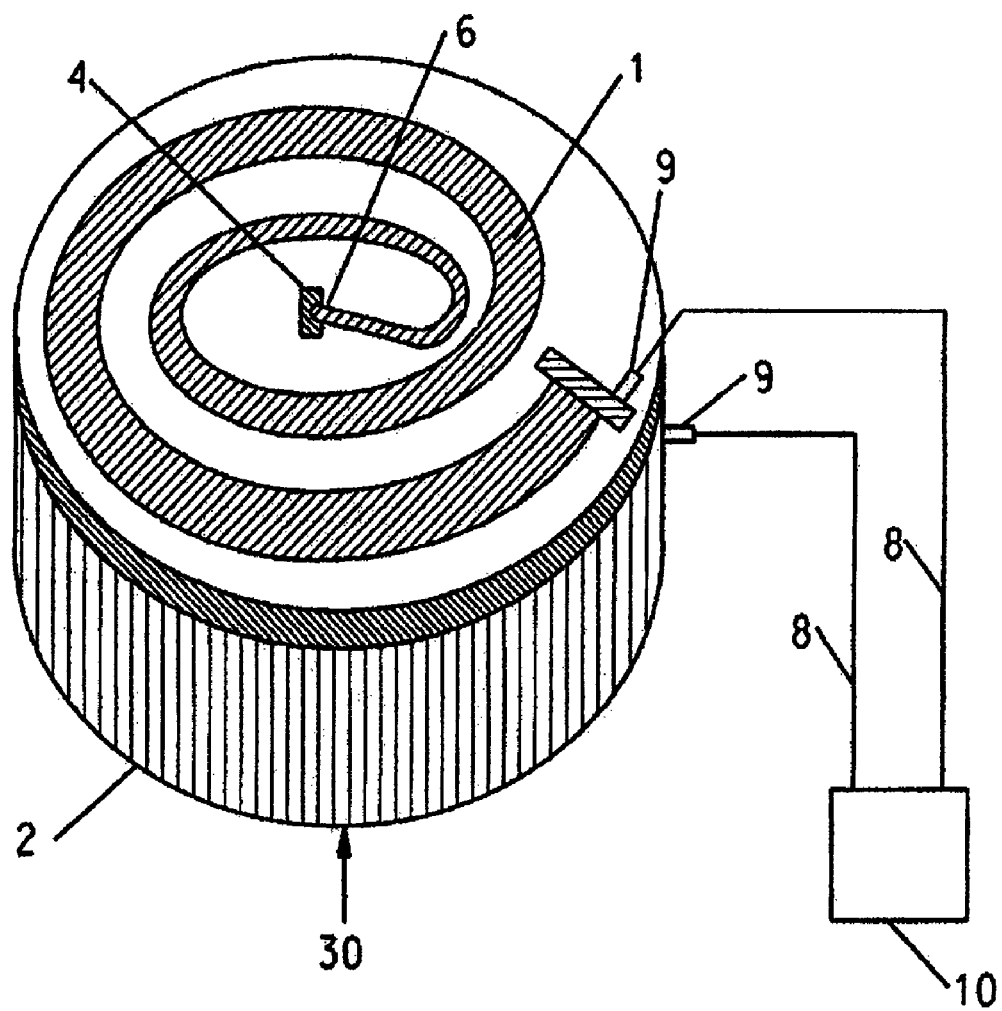
FIG. 3 illustrates an alternative embodiment of the device of FIG. 1.

FIG. 3 is a schematic showing another embodiment of the present disclosure that can achieve a more compact package. Here, electrode 2 is a cylindrical permanent magnet with magnetization direction emanating radially outward from the center. Electrode 1 now takes the shape of an exponential spiral, whose width increases exponentially with every turn. Alternatively, electrode 1 can have a linearly increasing spiral shape as a simpler approximation to the exponential spiral shape for ease of manufacturing. Because electrode 1 has a spiral shape, the current flow is in the tangential direction. The force on electrode 1 acts in the vertical direction, providing a repelling force that balances the electrostatic attracting force similar to that achieved in FIG. 1. The spiral shape of electrode 1 makes this embodiment have a more compact design, because the total tunneling area is not required to be spread across one long dimension as in FIG. 1. Cylindrical magnets with radial magnetization (measuring the magnetic field in a radial direction from the center of the device) are routinely available in the industry, as they are popular for building loudspeakers. The remaining components of this embodiment are the same as FIG. 1.

Figure 4:
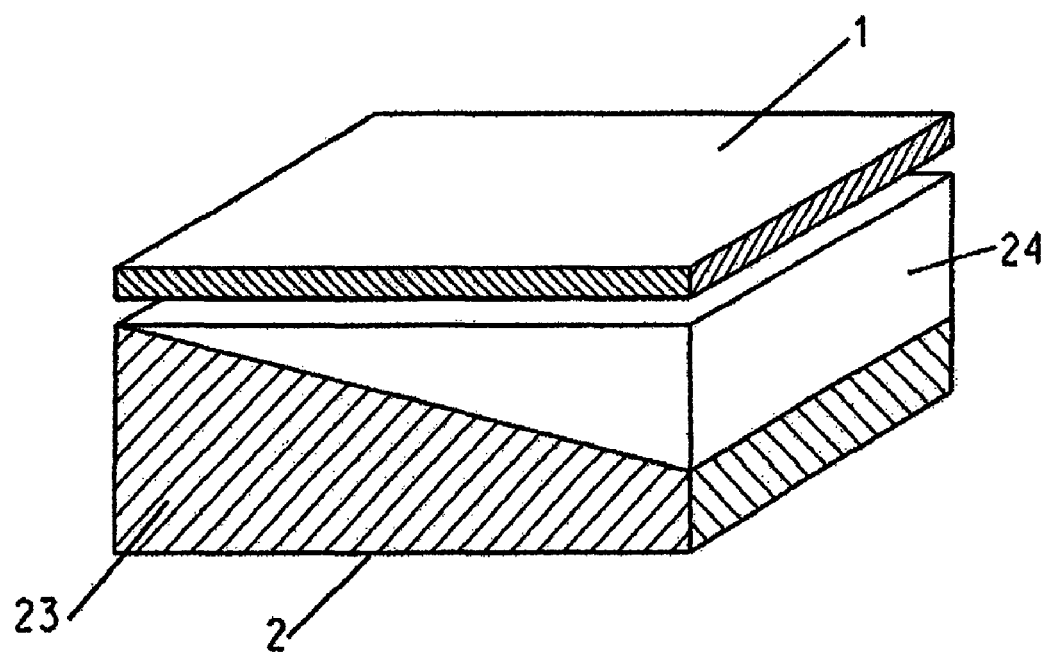
FIG. 4 illustrates yet another embodiment of the device of FIG. 1.

There are many other obvious embodiments to this invention in addition to the embodiments in FIGS. 1 and 3, which use a special shape of one electrode to achieve a uniform repelling force. FIG. 4 is a schematic drawing of one such other exemplary embodiment. It uses a varying magnetic field instead of a varying width electrode. For example in FIG. 4, the current density in electrode 1 increases from left to right as more current is made available from the tunneling area. In order to achieve a uniform force across electrode 1, the magnetic field is deceased from left to right because less field strength is needed as more current density is developed. Thus, the strength of the magnetic field varies in inverse proportion to the current density in flexible electrode 1 so as to achieve a constant force. One way for the magnetic field to decrease from left to right is to vary the depth of the permanent magnet material 23 contained in electrode 2 and increase the amount of non-magnetized material 24, such as copper or aluminum.

Figure 5:
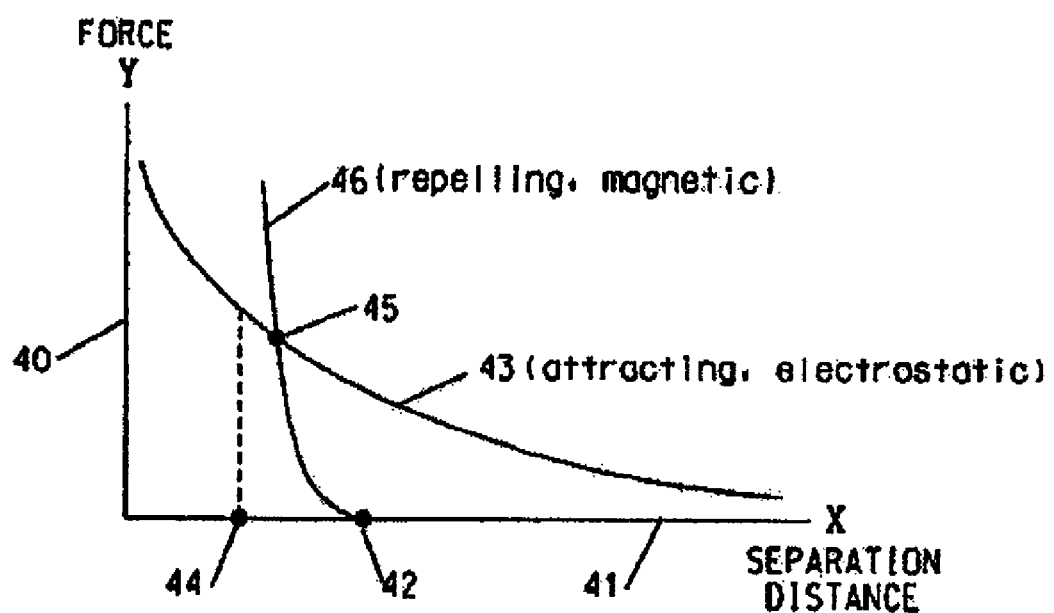
FIG. 5 is a graph qualitatively illustrating interacting forces in the devices of FIGS. 1-4.

FIG. 5 is a graphical illustration showing how the forces interact in FIGS. 1 through 4 to produce a constant spacing between the two electrodes over the tunneling area. The Y-axis 40 is force, and the X-axis 41 is spacing gap width or separation distance between the electrodes. Curve 43 shows the attracting, electrostatic forces between electrode 1 and electrode 2. The force illustrated in curve 43 is inversely proportional to the square of the spacing gap 41. Curve 46 shows the repelling force between the two electrodes generated by the tunneling current flowing in the presence of the magnetic field. This current is close to zero until the separation becomes narrow enough for tunneling to occur. Then it increases very rapidly as the spacing decreases further. The locations of the starting separation point for tunneling 42 and the separation point for full conduction 44 depend on the process conditions used. For example the starting separation point 42 for tunneling is around 20 nanometers for a device with an applied potential of 0.1-2.0 volts, and the point of essentially full conduction 44 is around 1 nanometer, according to Hishinuma. See *Efficiency of Refrigeration using Thermotunneling and Thermionic Emission in a Vacuum: Use of Nanometer Scale Design*, by Y. Hishinuna, et al; supra; and *Measurements of Cooling by Room Temperature Thermionic Emission Across a Nanometer Gap*, by Y. Hishinuma, et al.; supra. The attracting and repelling forces are equal at point 45. This is the separation where the device comes to rest in its stable equilibrium position. If any disturbances to the device cause a separation greater than point 45, the attracting force 43 overpowers the repelling force 46, causing tendency to move back to equilibrium point 45. Similarly, any disturbance that causes separation to be less than point 45, the repelling force 46 overpowers the attracting force 43 and again restores the device to its the equilibrium point 45.

In addition to the aforementioned electrode arrangement, the electrodes can also be arranged in multiple layers of periodic spacing. Additionally, multiple units of the device can be assembled in series, or in parallel, or in parallel and in series in order to achieve higher levels of energy conversion.

In operation, the strengths of the current distribution or density in flexible electrode 1 and the magnetic field of facing electrode 2 are adjusted to place the electrodes in a stable, spaced apart, equilibrium position. In one exemplary embodiment, when the device of the present disclosure is used in converting heat to electrical energy or to cool using electron tunneling or thermionic electron transfer, or a combination of electron tunneling and thermionic principles, the strengths of the current density or distribution in electrode 1 and the magnetic field of electrode 2 can be adjusted to place the facing electrodes in a stable, spaced apart, equilibrium position in the range of 1 nanometer to 20 nanometers using a flexible metal foil for one electrode. In another exemplary embodiment, when the device of the present disclosure is used in heat conversion to cooling or power generation by thermionic electron transfer, the strengths of the current density or distribution in electrode 1 and the magnetic field of electrode 2 can be adjusted to place the facing electrodes in a stable, spaced apart, equilibrium position in the range of 1 nanometer to 20 nanometers using a silicon wafer as the substrate for one or both electrodes.

The device of the present disclosure can be used in a process to convert heat to cooling or to electrical energy. The heat source can be a radiation source such as sun radiation, heat from the environment, geothermal energy, or heat generated from engines or animal metabolism, such as but not limited to heat from a living human body. The heat source can also be from a running electrical, steam or internal combustion engine, or by burning fuel as in a stove such as a wood stove or coal stove or other stove type, or their exhaust gases. When the heat source is, for example, from a running internal combustion engine or its exhaust gases, the present device can be incorporated in the engine or gas exhaust line as a heat sink. The fuel for burning can be wood, natural gas, coal or other combustible fuel. The converted energy can be stored such as in a battery or directed to power a handheld electrical device such as a cell phone, cordless phone or other aforementioned product.

The operation of the device of the present disclosure will now be explained when it is operating as a refrigerator. Referring again to FIG. 1, a voltage, increasing from zero, is applied between electrode 1 and electrode 2 by power supply 10. This voltage results in an electrostatic force that pulls the tip 6 of electrode 1 toward the surface of electrode 2. As the voltage is increased gradually, flexible electrode 1 bends downward toward the surface of electrode 2 in a rolling fashion starting from tip 6. This bending continues until electrode 1 gets so close to electrode 2 that a tunneling current starts to flow upwards from electrode 2 to electrode 1. This tunneling current, once reaching electrode 1 flows horizontally to the right within electrode 1 toward connector 9. Because this current is flowing in the I direction of FIG. 1a, and the magnetic field produced by the permanent magnet in nearby electrode 2 is in the B direction, then a force will act to push electrode 1 upwards. So long as the voltage from supply 10 continues to be increased, electrode 1 will flatten and match contours with the surface of electrode 2. The electrostatic force acts to pull the two electrode surfaces toward each other, and the opposing force from the current flow in electrode 1 prevents the two electrodes from getting closer than the desired spacing.

The operation of the device of the present invention as a generator device is similar, except that heat source 30 generates "hot electrons" moving from a high energy state of being hot in electrode 2 to a lower energy state of being cool in electrode 1. It is this motion of electrons from one energy state to another that creates the current flow between the electrodes. Electrical load 10 becomes the sink for the electrical energy thus produced.

In refrigeration operation, the electrical energy is used from the power supply to pull the hot electrons away from electrode 2 thereby cooling it. When operating as an electrical generator, heat source 30 is used to push electrons to the power supply.

EXAMPLES

The invention will be further illustrated by the following examples which are based on fundamental laws of physics in conjunction with experimental data and measurements obtained by the inventor and academic scientists as described herein. These examples show that: (1) the device of this disclosure can be designed and built using dimensions and processes that are common in the industry, (2) the quantified forces generated will result in the desired electrode separation, and (3) the electrical properties of the invention device can carry and transmit the converted electrical energy effectively. The examples demonstrate the above three attributes of the invention device for thermo-tunneling converters, in which the electrode separation is less than 20 nanometers and for thermo-photovoltaic converters in which the electrode separation is about 100 nanometers.

Example 1

For a thermo-tunneling converter, consider the following dimensions in FIG. 1, 2 or 3:

The total overlapping tunneling area Y of the facing electrodes is 1 square centimeter or $10^{-4}$ square meters. The length L of the flexible electrode 1 is 2 centimeters, and the maximum width W is 1 centimeter. The length L and width W are defined similarly for FIG. 3, but electrode 1 is wrapped around into a spiral shape as compared to a linear shape for FIG. 1. The facing surface of electrode 1 is surface-patterned or has a surface roughness such that the total tunneling area X (the sum of all x's) is one-tenth the total surface area Y or $10^{-5}$ square meters. The permanent magnet material used in electrode 2 has a field strength B of 1.2 Tesla. The voltage V between the electrodes is 0.15 volts. The permittivity constant ∈ of either vacuum or rarified inert gas between electrodes 1 and 2 is equal to $8.8 \times 10^{-12}$ farads per meter. The resistivity r of the flexible electrode 1 is assumed to be close to that of copper, or $1.7 \times 10^{-8}$ ohm-meter. The resistance of the path of electrons from the upper connector 9a to the other, lower connector 9b is assumed to be fully concentrated in electrode 1 due to it needing to be thin and flexible compared to the rest of the circuit. The thickness t of flexible electrode 1 is 20 microns, and therefore is a foil material.

The formula for the attracting electrostatic force $F_e$ is $1;2 \in XV^2/d^2$ where d is the separation between the electrodes. The formula for the repelling, magnetic force $F_m$ is ILB where I is the current, and L is the effective average length of the current flow in electrode 1.

The tunneling current I as a function of separation is taken from the graphs of Hishinuma and assumes a work function of coating 5 of FIG. 1 of 1.0 eV, and an operating temperature of 300 degrees Kelvin. See *Efficiency of Refrigeration using Thermotunneling and Thermionic Emission in a Vacuum: Use of Nanometer Scale Design*, by Y. Hishinuna et al., supra; and *Measurements of Cooling by Room Temperature Thermionic Emission Across a Nanometer Gap*, by Y. Hishinuma, et al, supra.

Figure 6:
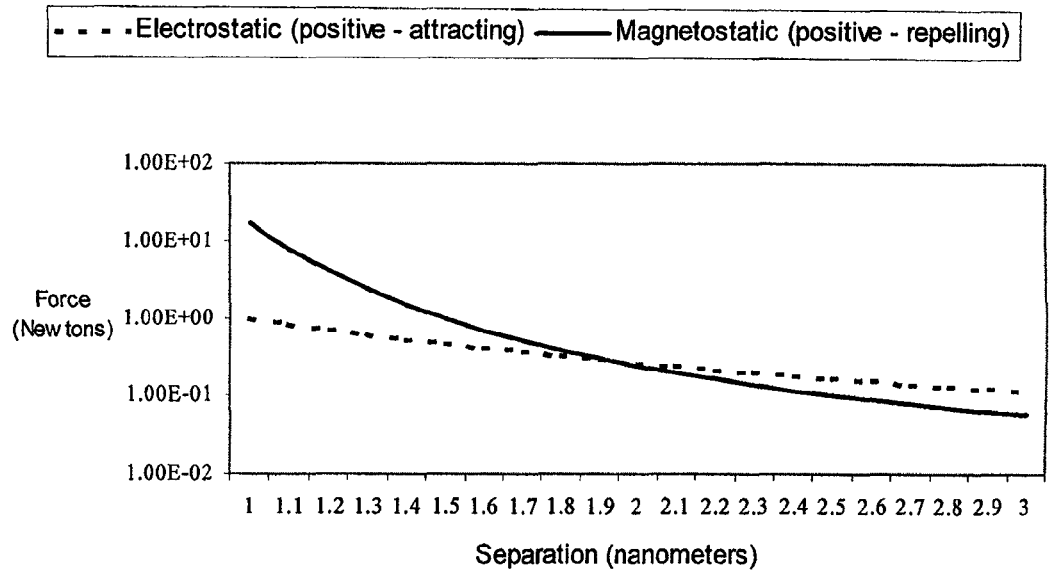
FIG. 6 is a graph quantitatively illustrating interacting forces in the devices of FIGS. 1, 3 and 4 using polished metal electrodes.

In FIG. 6 the force functions $F_m$ and $F_e$, for the values listed above are plotted, with a logarithmic scale, on the Y axis vs. the electrode separation gap d, with an arithmetic scale, on the X axis. This plot produces a graph like FIG. 5 only now it is fully quantified. The stable equilibrium point 45 is close to 2.0 nanometers, which is in the desired spacing range to achieve a tunneling current of 20 amperes, according to Hishimuna. See *Measurements of Cooling by Room Temperature Thermionic Emission Across a Nanometer Gap*, by Y. Hishinuma et al., supra. As disturbances try to shift the spacing gap away from the stable equilibrium in either direction, the restoring forces are greater than 0.2 Newton, which is sufficient to overcome the bending resistance of the flexible electrode and push it back to its equilibrium position.

With the emitting electrode at room temperature, a current flow of 20 amps, and a voltage of 0.15 volts, the device can achieve either an electrical power generation capacity or a refrigeration capacity of 16 watts, which is computed as the current (I) times the Peltier coefficient of 0.8 used in this example as described in *Measurements of Cooling by Room Temperature Thermionic Emission Across a Nanometer Gap*, by Y. Hishinuma, et al., supra. The resistance power lost in the flow of this current through flexible electrode 1 is $I^2 rL/tw$. With the values mentioned above, the ohmic power loss calculates at 1.0 watt, which is assumed to be manageable both as a power loss and as a source of heating electrode 1. Heat transfer from electrode 2 to electrode 1 can also take place by radiation, convection and conduction, but is estimated to be no more than 1.3 watt when the chamber of the invention device is evacuated to a level of 0.06 mm Hg of argon gas. Finally, there is an electrical heat generated in electrode 2 as described in *Measurements of Cooling by Room Temperature Thermionic Emission Across a Nanometer Gap*, by Y. Hishinuma, et al., supra, which is equal to the voltage V times the current I, or about 3.0 watts in this example. The remaining available energy from the 16 watts of converted energy is 10.7 watts. This corresponds to a calculated efficiency of 67 percent.

So, we see that the system level characteristics of this device, based on established electromagnetic theory, support a workable design and a means for reducing to practice for a thermo-tunneling converter with high efficiency.

Example 2

Another example of the versatility of this invention is in the choice of materials. The preferred embodiment, as described in Example 1, includes a metal foil as one of the electrodes. Another embodiment could use a single-crystal silicon as the flexible electrode. Although silicon is not normally regarded as a flexible material, it is routinely fabricated in the industry with a roughness of 0.5 nanometers and a flatness of 1 micrometer across a square centimeter surface. Although silicon is much stiffer than a metal foil as measured by the Young's Modulus, its flatness indicates that very little bending is required to approach ideal flatness. The forces generated by the invention will be shown to be able to bend a silicon wafer by the one micron needed flatten it completely. Overall, using silicon as the base material for the flexible or both electrodes has several advantages: (1) silicon wafers are readily available at low cost, (2) silicon wafers have desirable roughness and flatness characteristics, (3) adding low work function materials or patterns of materials on silicon is readily and frequently performed in the industry, (4) the resistivity of silicon prevents the flexible electrode from reacting too quickly during contact or near contact with the other electrode of the invention, and (5) the desired resistivity of silicon can be arbitrarily controlled through doping, which is also common practice in the industry. Overall, the invention's design can be built with materials and processes that are routinely available in the semiconductor industry.

Figure 8:
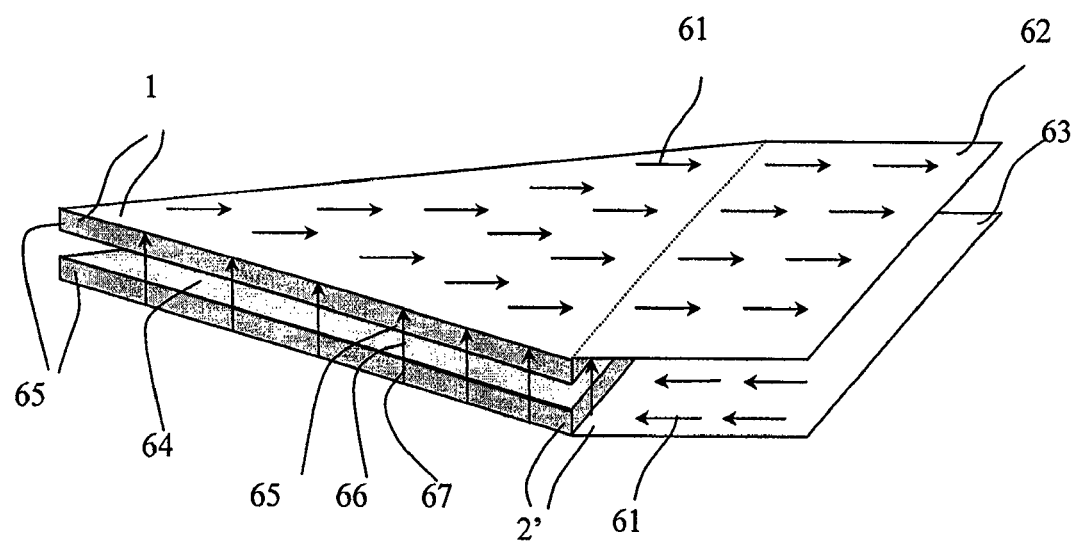
FIG. 8 is a drawing showing how the electrodes may be built from silicon wafer material.

In order to illustrate the example of the invention using silicon for the flexible electrode, consider FIG. 8. Here, electrode 1 is comprised of a foil backing 62 and a silicon substrate 65. The shape of electrode 1 in FIG. 8 is triangular, approximating the optimal exponential shape described in Example 1. The silicon substrate 65 can be cut from a standard wafer and then be bonded to the foil backing 62 of electrode 1 using a conductive adhesive. Electrode 2' in FIG. 8 is constructed like electrode 2 in FIG. 1 only the magnet is not shown and is assumed to be positioned separately. By separating the magnet from electrode 2', it is possible to construct electrode 2' in FIG. 8 using the same materials and process as electrode 1 in FIG. 8. Arrows 61 indicate the directional flow of electrons. Because the foil backing has much higher conductivity than the silicon, the electrons will follow a path of least resistance. Hence, electrons flow from right to left through the foil backing of electrode 2' via conduction, then they flow vertically through the silicon substrate of electrode 2' as indicated by portion of arrow 67, then the electrons flow via tunneling or thermionic emission from surface 64 of electrode 2' to electrode 1 in a vacuum as indicated by portion of arrow 66. Once the electrons reach electrode 1, they again flow through a silicon substrate vertically as indicated by portion of arrow 65 and finally reach the foil backing 62 of electrode 1. Then, they follow a very low-resistance path from left to right through the foil backing 62 of electrode 1. The flow of electrons as indicated directionally by the arrows 61 interact with a magnetic field of a nearby permanent magnet, which is not shown in FIG. 8.

In this example, the total thickness $t_s$ of the silicon is 0.5 millimeter or 0.25 millimeter per wafer, which is an industry standard thickness. The silicon material is doped to have a resistivity $r_s$ of 0.02 ohm-cm, which is also commonly practiced. The Young's Modulus $E_s$ for silicon is known to be 47 Giga Pascals or $4.7 \times 10^{10}$ Pascals. Silicon wafers are routinely polished in the industry to 0.5 nanometers of surface roughness and achieve a surface flatness $d_x$ of 1.0 micron for a wafer of lateral dimensions of one centimeter.

Figure 7:
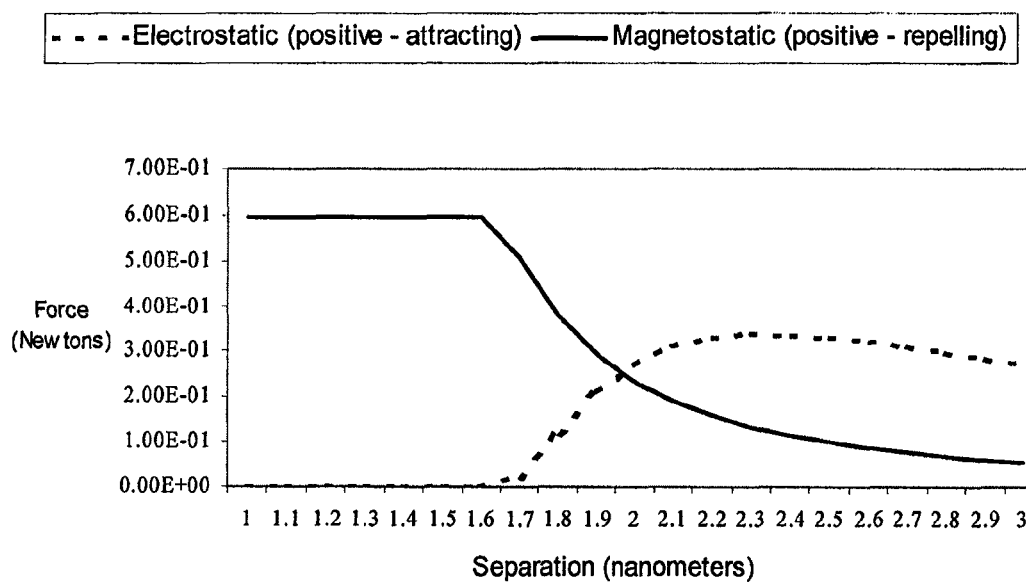
FIG. 7 is a graph quantitatively illustrating interacting forces in the devices of FIGS. 1, 3 and 4 using polished silicon electrodes.

FIG. 7 shows the effect of the silicon on the forces as compared to FIG. 6. The magnetostatic force is limited to 0.6 Newtons as the gap becomes very small. The resistance of the silicon limits the current flow and hence the magnetostatic repelling force. Also, a very narrow gap will cause all of the supply voltage to drop in the silicon resistance, and zero voltage appears across the gap, which means the electrostatic attracting forces are zero for a very small gap spacing.

To quantify these effects, consider the maximum current that can flow in this system, which is the supply voltage V divided by the silicon resistance, which is equal to $r_s t_s / Lw$. For the applied voltage, length, and width of the electrode in the Example 1, the maximum current flow is about 50 amperes when the silicon is present. Furthermore, when the current approaches this 50-ampere level, the supply voltage is all dropped across the silicon and no voltage difference can be achieved across the facing surfaces of the electrodes.

The restoring differential forces in FIG. 7 are relatively large. According the to the figure, a 0.1 nanometer deviation from the desired separation produces a restoring force greater than 0.05 Newtons. This restoring force is much greater than the bending forces required to flatten electrode 1 and much greater than the bending forces required to achieve parallelism with electrode 2, as will now be calculated.

In order to flatten out a one-micron corrugation in electrode 1, a force of $40 d_x E_s w t_s^3 / 12 L^3$ is required. This force calculates to 0.003 Newtons. If electrode 1 and electrode 2 have opposing corrugations, then the required force is twice this amount or 0.006 Newtons, which is much less than the 0.05 Newtons of restoring force available to maintain a gap within 0.1 nanometers of the desired gap.

The force characteristics in FIG. 7 with a silicon electrode material are more desirable than those in FIG. 6 with a metal foil material for the following reasons: (1) the forces with the silicon present do not become so large as to cause oscillations or sudden movement that could damage or destabilize the system as in the case of pure metal electrodes, (2) a silicon wafer's greater flatness versus metal foil allows the system to start out much closer to the desired operating point, (3) the resistance of silicon prevents large currents forming in small localized areas that can result in high temperatures and evaporative damage to the electrode materials, (4) the stiffness of the silicon reduces the amount of movement of the material to sustain the gap over time and hence reducing the risk of fatigue, cracking, or deformation, and (5) the higher stiffness and flatness of silicon insures the gap can be maintained in the presence of local variations which reduces the need for precision in the exponential shape, uniformity of the electrode thickness, and other parameter variations of the materials and design.

Example 3

Figure 9A:
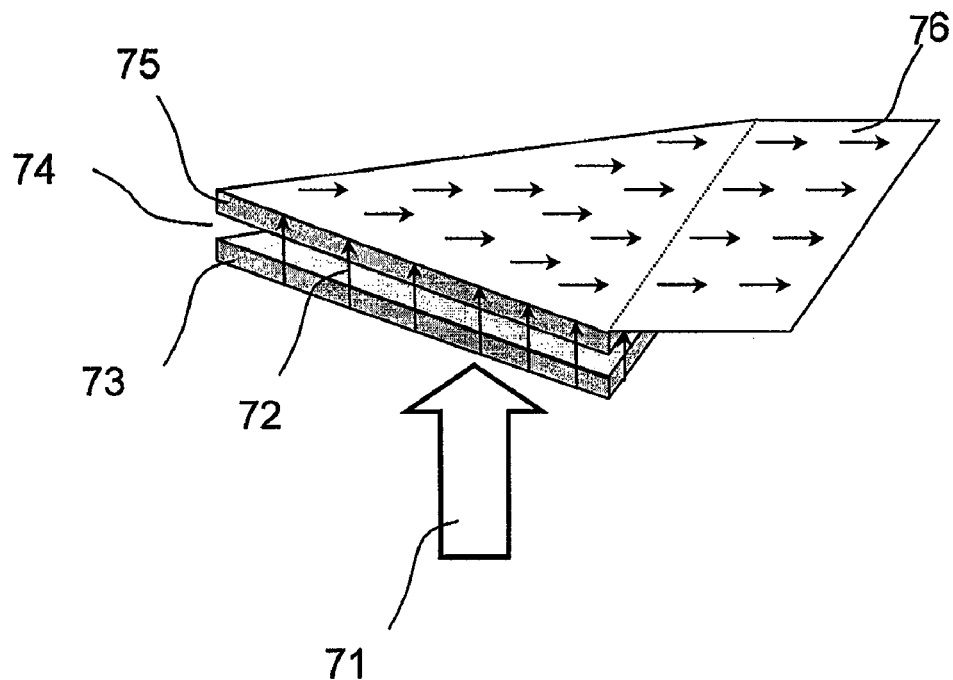
FIG. 9a illustrates an alternative embodiment with a larger gap that is appropriate for thermo-photovoltaic applications.

FIG. 9a shows another example of how this device could be used for a different type of energy conversion called thermophotovoltaic. In this example, a heat source 71 causes photo-emissive material 73 to begin radiating light illustrated by 72 across a gap 74 that is smaller than the wavelength of the light to photosensitive material 75, which in turn creates an electric current illustrated by arrows 76. In this example, the photo-emissive material 73 could be tungsten or similar. The photosensitive material 75 could be silicon, selenium, gallium, arsenic, indium or some combination or alloy of these. The required length for the gap 74 is typically less than smallest wavelength emitted by photo-emissive material 73 or about 100 nanometers in order to achieve near-field optical conditions. The photo-emissive electrode 73 in this case is rigid, flat and polished on the gap side. The photosensitive electrode 75 has enough flexibility to flatten out to a largely uniform gap of about 100 nanometers.

Figure 9B:
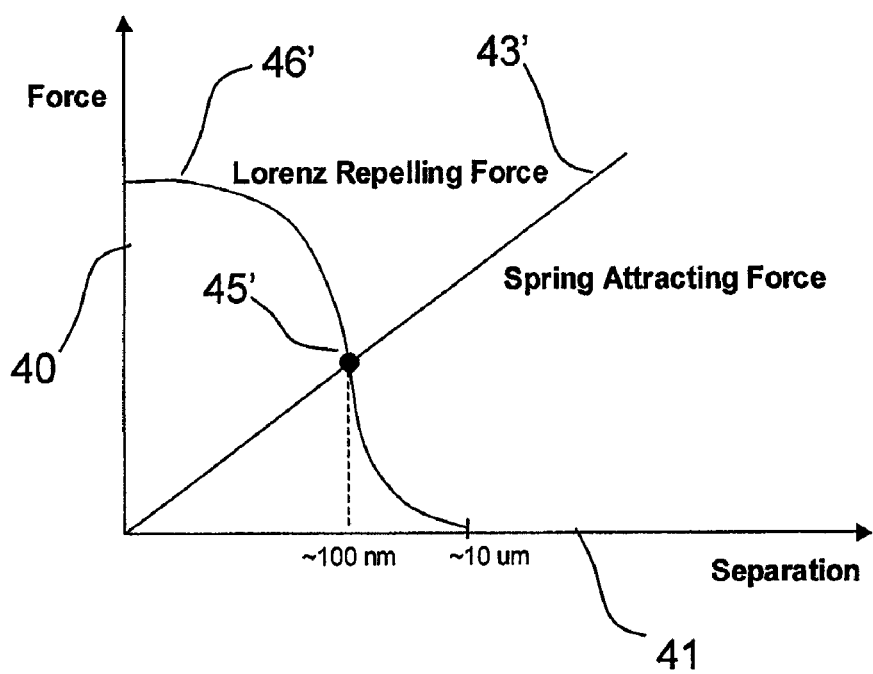

FIG. 9*b* shows a graph of the forces that can create a stable gap in a thermo-photovoltaic implementation of this invention. Because the electrostatic force is too small at these distances to be significant, a spring force or similar external force can be substituted to cause an attraction between the two electrodes. The spring force has a linear magnitude as a function of gap separation. The balancing repelling force is generated as in the previous examples by the current illustrated by arrows 76 flowing in the presence of a magnetic field, which is not shown in FIG. 9. This current is generated by the photosensitive material receiving photons from the emission of electrode 73, but otherwise serves to create and maintain a uniform gap separation as described in the previous examples. The repelling force 46' in FIG. 9*b* is proportional the thermo-photovoltaic current whose behavior vs. separation was derived from *Micron-gap ThermoPhotoVoltaics (MTPV)*, by R. DiMatteo, et al, supra.

Example 4

Figure 10A:
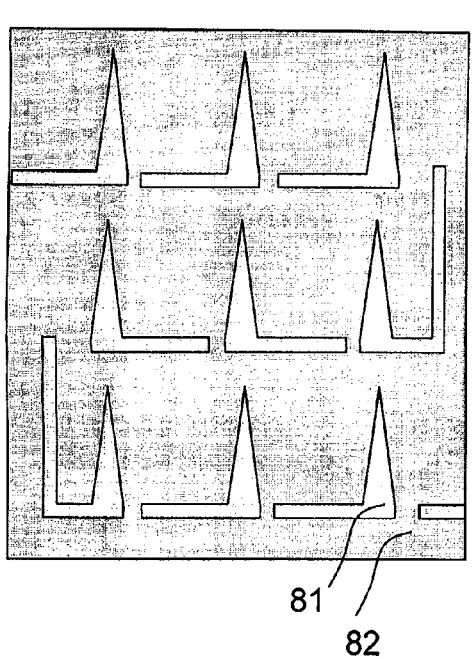
FIGS. 10a-10c show how multiple electrode pairs of FIG. 8 can be assembled simultaneously for mass production using process techniques that are common in the semiconductor industry.
Figure 10B:
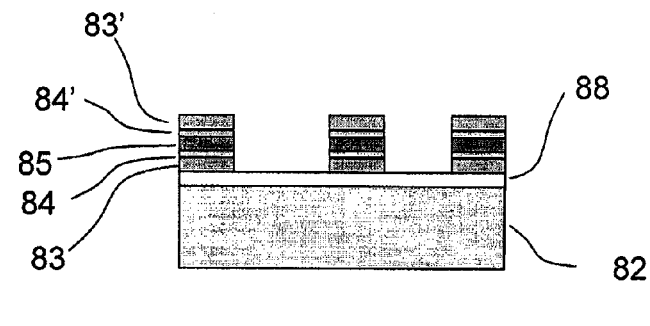
Figure 10C:
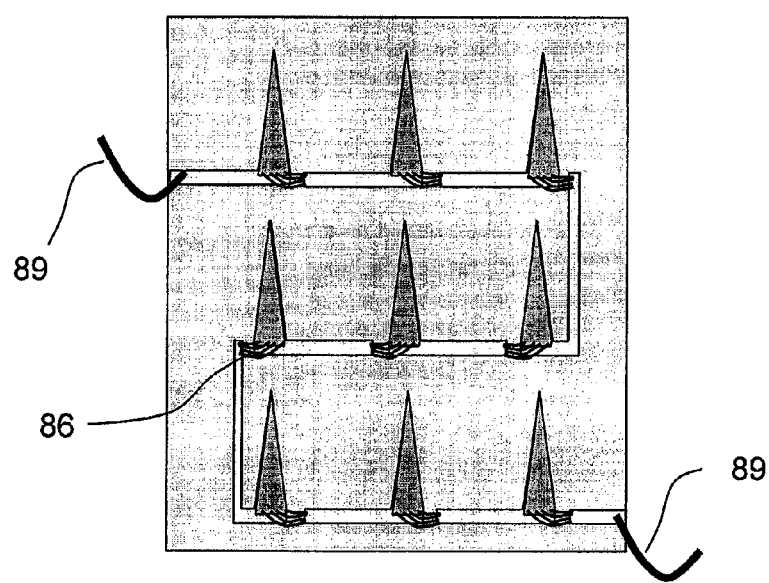

FIGS. 10*a*-10*c* illustrate how the design of FIG. 8 or FIG. 9 could be assembled wherein the multiple devices are connected in series electrically and in parallel thermally. Furthermore, FIGS. 10*a*-10*c* illustrate how to scale up to multiples of these devices using manufacturing techniques that are widely used in the semiconductor industry. FIG. 10*a* shows a base substrate 82 that holds one side of multiple devices. This substrate 82 is cooled when the device is operating as a thermo-tunneling cooler, or is heated when operating as a heat to electricity converter, or is radiating when the device is operating as a thermo-photovoltaic converter. FIG. 10*b* shows a side view of the film stacks that may be created to manufacture multiple devices on one substrate 82. Substrate 82 is made of silicon, silicon carbide, aluminum, gallium arsenide or similar substrate material used in commonly in the industry. Layer 88 is an oxide or similar film that electrically insulates the first metal layer 83 from the substrate layer 82 but still allows for thermal conduction. First metal layer 83 is a highly conductive, and relatively thick layer for carrying current for thermo-tunneling operation or for carrying heat for thermo-photovoltaic operation. Layer 83 can be copper for example, or a less expensive metal like aluminum. Gap layer 84 is the metal or other film that is best suited to interface to the gap. In the case of thermo-tunneling, this layer 84 could be gold to protect from oxidation and contamination, as gold is an inert metal. In the case of thermo-photovoltaic operation, gap layer 84 could be tungsten or other material that is highly photo-emissive in order to maximize the conversion of heat to photons that traverse the gap. Layer 85 is a sacrificial layer that is later removed after the film stack of layers 83, 84, 84', and 83' are produced. The sacrificial layer provides a structure to lay down additional films that comprise the second electrode. After removal of sacrificial layer 85, the gap is formed between layers 84 and 84' by the previously described force balance of FIG. 5, 6, 7 or 9*b*. Layer 84' is optimized to receive the energy from the gap and to protect layer 83' from contamination or oxidation. In the case of thermo-tunneling operation, layer 84' could be made of gold. In the case of thermo-photovoltaic operation, layer 84' could be a photosensitive material described as material 75 in FIG. 9*a*. Layer 83' is the current carrying layer that carries current out of the device, and its material could be copper or aluminum. Once the film stack shown in FIG. 10*b* is created using semiconductor processing, the series electrical connections are made as illustrated in FIG. 10*c*. In this case, electrical connections are made from the top electrode to the neighboring substrate electrode using wire and wire bonds 86. Wires 89 indicate the electrical input and output to the multiple devices. Sacrificial layer 85 can be made of any material that can be removed with a processing liquid, gas, or by melting or evaporating it out with heat.

Figure 11A:
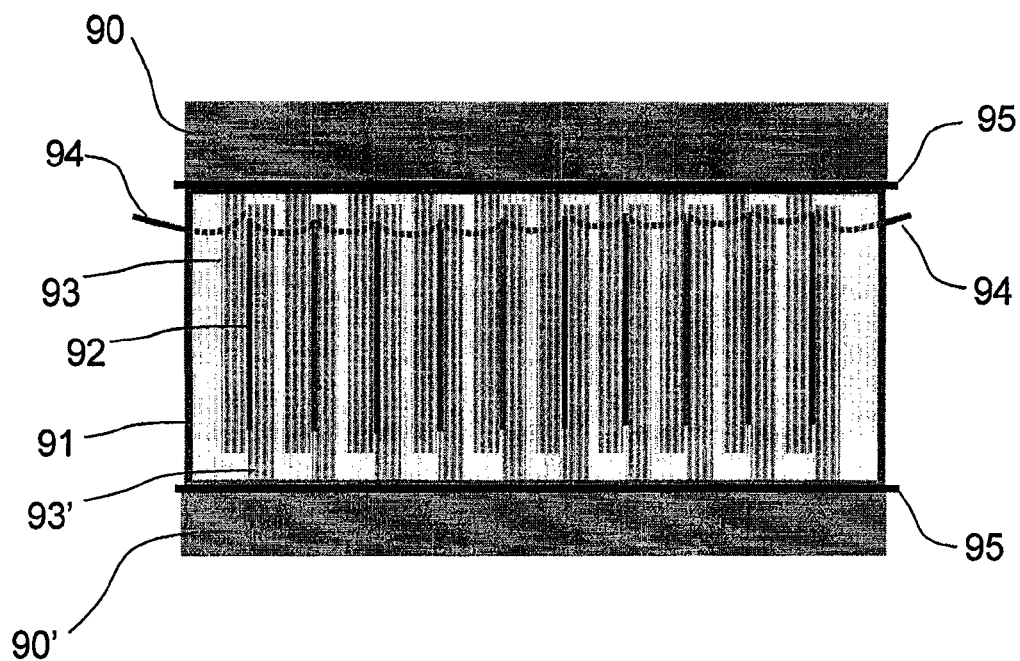
FIGS. 11a-11b show how multiple electrode pairs of FIG. 8, 9a or 10c can be packaged into a large heat exchanger to achieve higher density and capacity of the device function.
Figure 11B:
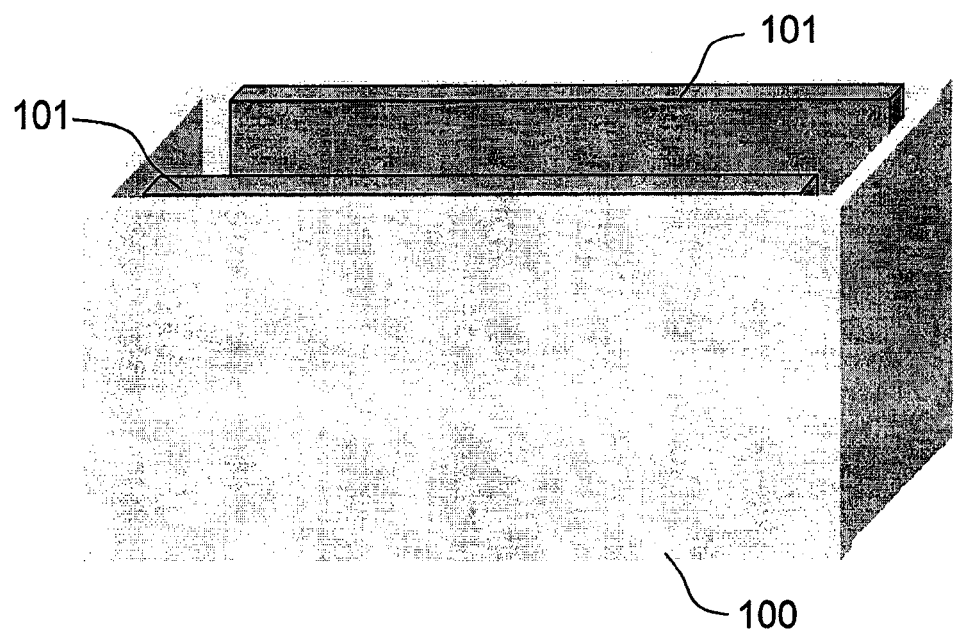

Once a pair of devices is created as shown in FIG. 8, 9*a*, or 10*c*, then they can be inserted into a heat exchanger package as illustrated in FIG. 11*a*, for example. Here, the electrode pairs or arrays of electrode pairs 92 move heat from one fin 93 to corresponding fin 93'. Fins 93 are all physically connected to first thermal plate 90, and corresponding fins 93' are all connected physically to second thermal plate 90'. Thermal plates 90 and 90' represent the hot side and cool side for thermo-tunneling or thermo-photovoltaic operation by aggregating together the smaller hot sides 93 and smaller cool sides 93', respectively. Thermal plates 90 and 90' are made from a material with high thermal conductivity such as copper, aluminum, or silicon. Rectangular tube 91 provides the walls for the sealable container and is made from a material with low thermal conductivity, such as glass, Teflon, polyimide or similar material with sufficient compressive strength. The low thermal conductivity allows for thermal isolation of the hot and cool plates 90 and 90' enhancing the effectiveness of the system. If plates 90 and 90' have mismatched thermal expansion characteristics relative to the tube walls 91, then interface material 95 could be made of a soft vacuum-compatible rubber like Viton, or Teflon, polyimide or similar material used to make o-rings in the industry for these types of seals. If the thermal expansion characteristics of thermal plate material 90 and 90' and tube wall material 91 are approximately equal, then the interface material 95 could be a hard bonding material like glass frit, epoxy, solder, or weld. FIG. 11*b* shows how to build a magnet structure that surrounds the heat exchanger package 11*a* and supplies the magnetic field needed to form the gaps in electrode pairs 92 of FIG. 11*a*. Permanent magnet 101 is fixed in a rectangular ring of a magnetically permeable material 100. Permanent magnets 101 could be made from standard materials used for magnets such as alloys of iron, cobalt, nickel, neodymium, boron, and aluminum. Typically, this alloy is sintered into small particles and then repacked into the desired shape with a binder material in order to achieve a high remaining magnetization when magnetized. Rectangular ring 100 could be made from the same steel used in transformers to maximize magnetic permeability and the magnetic field produced by the permanent magnets 101. Such material can be iron-rich steel, or some other alloy of iron, cobalt, nickel, chromium, and platinum, for example.

Figure 13:
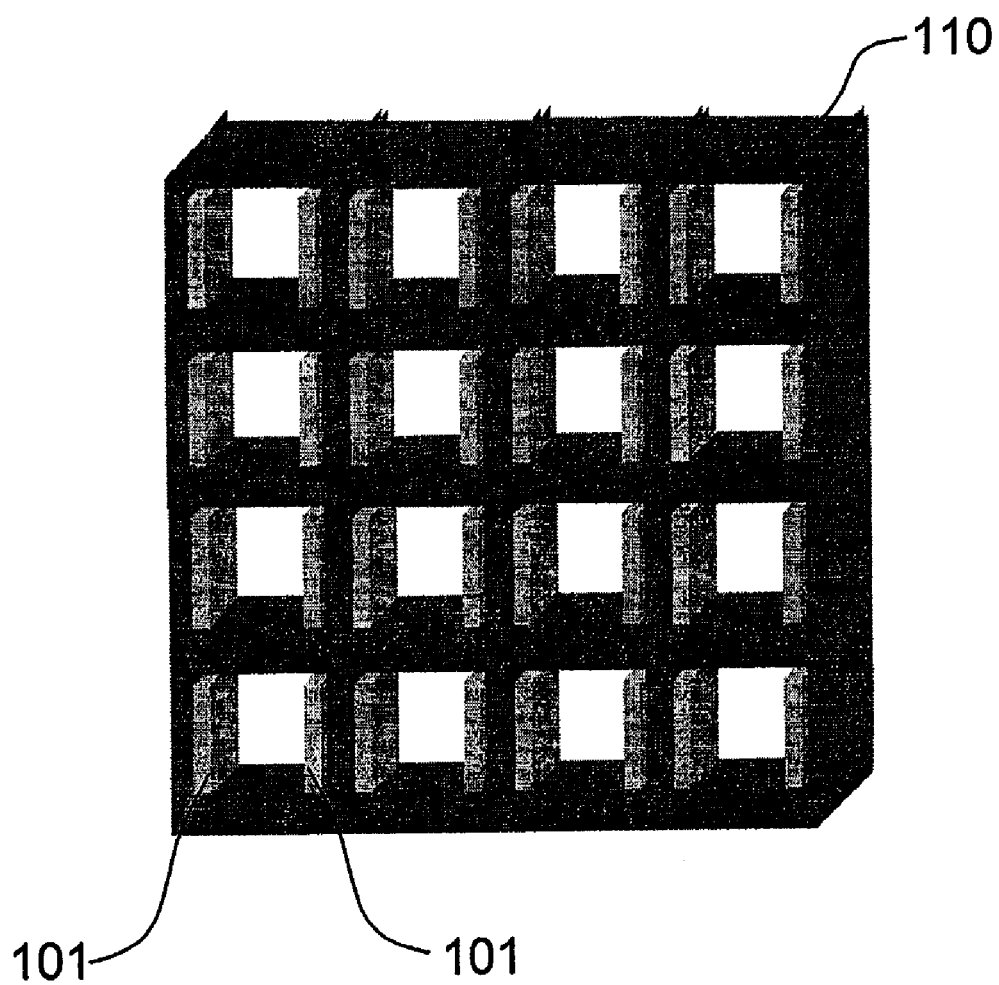
FIG. 13 shows an array of permanent magnets attached to a magnetically permeable grating in order to make a larger device from the smaller devices of FIG. 8, 9a, 10c, 11a or 12b.

FIG. 13 shows how the magnet assembly can be scaled up to accommodate an array of heat exchangers. Magnetically permeable material 110 is arranged in a grating structure with an array of voids to insert devices shown in FIG. 8, 9*a*, 10*c*, or 11*a*. Permanent magnets 101 are inserted in each cell to produce a magnetic field in between the magnets.

In a highly miniaturized fabrication process, the magnet array of FIG. 13 could be built on top of the substrate of FIG. 10*c* and arranged such that the electrode pairs of FIG. 10*c* are contained in the voids of the magnet arrays of FIG. 13. In this case of miniaturization, the permanent magnets 101 and permeable material 110 could be grown as metal films of the materials mentioned using standard processes like evaporation, sputtering, or plating directly onto the substrate similar to the construction of the electrode films in FIG. 10*b*.

Figure 14:
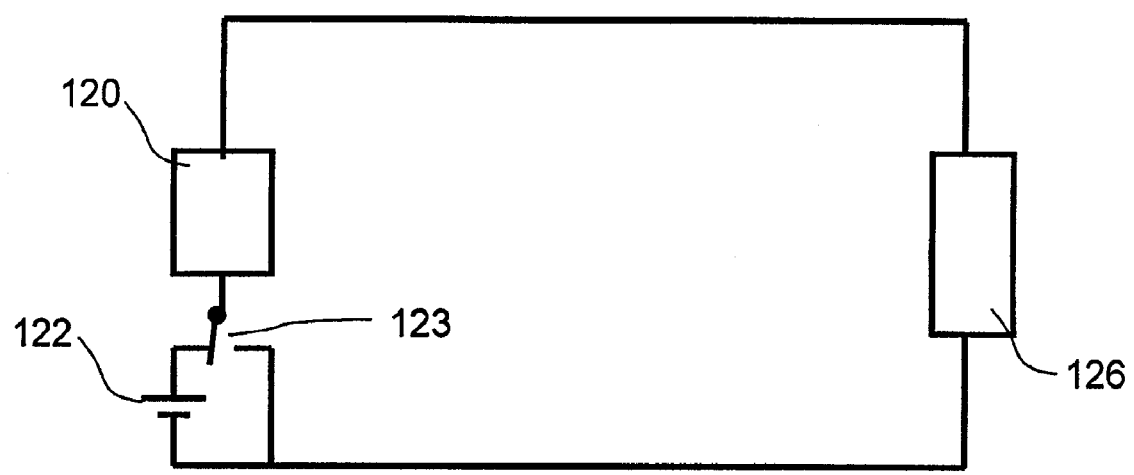
FIG. 14 is one example of a start-up electronic circuit that can be used to form the gap in the device of FIG. 8, 10c, 11a or 12b prior to applying heat energy for the embodiments wherein electricity is generated.

FIG. 14 illustrates an additional electrical circuit that might be needed when the device of FIG. 8, 10*c*, or 11*a* is operating as a thermo-tunneling converter of heat to electricity. Because the device of this invention 120 requires an electrical current to be flowing in order to achieve the gap formation, the gap is not present prior to a current flow. In FIG. 14, an external power source 122 provides a current flow that can be used to form the gap in device 120. Once the gap is formed and heat is applied to one electrode, then a temperature difference is created relative to the other electrode. Once this temperature difference is present, then thermo-tunneling of hot electrons will begin to flow, creating additional current flow. Once the thermo-tunneling current is flowing, it alone can maintain the gap in device 120 as described previously. Now, the external power source 122 is no longer needed and it can be switched off by switch 123. Hence, the circuit of FIG. 14 is a startup circuit for thermo-tunneling conversion of heat to a power source for an electrical load 126. Switch 123 can reapply external power source 122 whenever the heat source is removed and is subsequently re-established.

Example 5

Figure 12A:
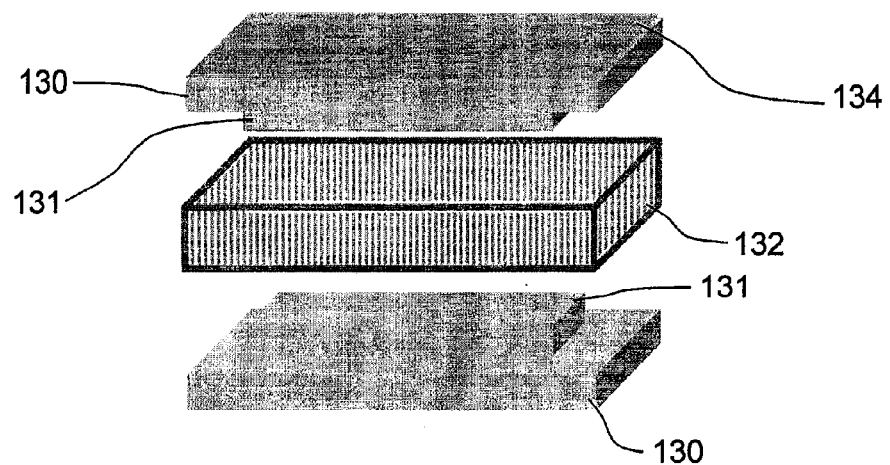
FIGS. 12a-12b illustrate how the electrode pair of FIG. 8 may be packaged using silicon, glass, glass-frit vacuum sealing, and other standard micro-electro-mechanical (MEMs) packaging techniques that are common in the industry.

FIG. 12a shows another example for packaging the electrodes of this device that is similar to how micro-electromechanical systems (MEMs) are packaged when a vacuum environment is required. The top and bottom thermal plates 130 can be made of silicon and can be cut from standard silicon wafers. Silicon has a high thermal conductivity and hence is well suited for the thermal path of this device. The wall of the package 132 is made of glass, which has a low thermal conductivity but a thermal expansion coefficient that is close to that of the silicon thermal plates 130. Because glass and silicon have similar thermal expansion characteristics, then it is possible to use the well-known glass frit bonding method between 130 and 131. Glass frit bonding is typically used to bond two glass pieces together, but can also bond glass to silicon since a glass silicon dioxide layer naturally forms on silicon surfaces exposed to air. The result is a very hard and tight seal between the glass and silicon that can easily withstand the pressure of a vacuum. Similar vacuum packages are used in the MEMs industry for accelerometers, oscillators, and high frequency switches. Pedestal layer 131 is also made of silicon and can be bonded to thermal plate 134. Metal layers 134 on the top and bottom thermal plates 130 are used to make an electrical connection to the electrodes inside the package without requiring through-holes or other mechanisms that limit the life of light bulbs and other vacuum products.

Figure 12B:
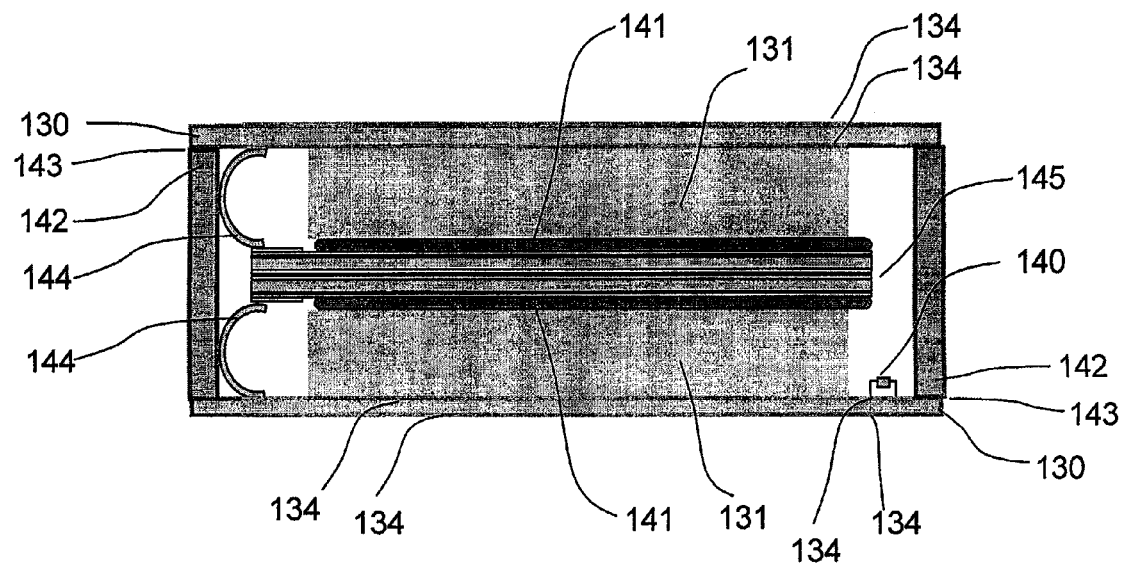

FIG. 12b shows how the electrodes might be contained within the vacuum package of FIG. 12a. The electrode pair 145 corresponds to FIG. 8, 9a, or 10c. Thermal interface material 141 conducts the heat to or from each electrode to the outside of the package and also provides a soft layer for the electrodes to move against during operation. Examples of thermal interface material 141 are gap pad from Bergquist Corporation, vacuum grease from Apiezon or Dow Chemical, carbon nanotube compounds and mixtures from MER Corporation or other soft materials mixed with thermally conductive particles. Bonding material 143 bonds the glass wall to the silicon thermal plates and examples of this material are epoxy and glass frit. Wires 144 connect the base of the electrodes to the top and bottom plates. Example materials for the wires are flat foil or cylindrical wire made of copper, aluminum, or other electrically conductive material. Copper layers 134 allow for current to flow widely across the resistive silicon plates 130. The silicon plates might be doped with Boron, Arsenic, or similar element in order to increase its electrical conductivity and minimize the resistive losses of the current flow into the package. Getter filament 140 heats up when a voltage is applied to its copper pads 134 much like the filament in a light bulb. A suitable material like Cesium chromate is coated on the filament 140 to allow for the release of Cesium vapor into the vacuum package. The Cesium vapor accomplishes the following functions once released: (1) evacuating the remaining air and other gases inside the package after sealing by reacting with these gases to produce solids, (2) removing gases that leak into the chamber over the life of the device by reacting similarly, and (3) to naturally form a Cesium monolayer or sub monolayer on the gap-facing surfaces of electrodes 145 and thereby produce a low work function layer to encourage emission of electrons across the gap.

Other Examples

The above basic examples indicate how a working thermo-tunneling system can be designed to achieve cooling or power conversion. Other examples are easily designed by altering one or more of the parameters used in Examples 1 and 2. The gap distance can be increased by one or more of the following changes: (1) increasing the magnetic field, (2) decreasing the voltage, (3) increasing the current flow, (4) increasing the length of the flexible electrode, or (5) decreasing the area of the flexible electrode. The gap distance can be decreased by making the opposite changes.

It should be noted that several of the features described herein may not be necessary or can be achieved without additional manufacturing complexity. Because the industry has not been able to produce a working thermo-tunneling converter larger than nanometer dimensions, the actual behavior at a larger scale is not known. For example, referring again to FIGS. 1a-1b, the low work function layer 5 may not be necessary if the gap can made slightly smaller. The enhancing material 5' might be just as easily accomplished by the surface roughness after polishing, which naturally produces the peaks and valleys that are known to enhance electron emission. The resting tip 6 also may not be required given the choice of resistive materials for electrode 1 or 2. The electrode patterning in FIG. 2a, which also provided peaks and valleys to reduce the electrostatic force, might also be achieved by natural surface roughness after polishing. Finally, the vacuum chamber 20 may not be required if the tunneling process has been demonstrated experimentally in an air gap. In addition, the exponential shape of electrode 1 may be approximated by an easier to manufacture triangular shape. All of these complicating features (tip 6, layer 5, enhancing material 5', patterning in FIG. 2a, the curved shape of electrode 1, and vacuum chamber 20) were included in this disclosure for completeness in describing what might be required in final production.

The devices disclosed herein are versatile in building various types of electronic junctions for the electronics industry that requires a uniform gap between electrodes. For example, a thermoelectric device having poor thermal insulation between the hot side and cool side could employ the present disclosure. A vacuum spacing on top of a thermoelectric stack could provide better thermal insulation, and this disclosure provides a means for accomplishing this gap either independent of or in combination with thermionic or thermo-tunneling methods.

A final comment on the ease of manufacturing of the devices disclosed herein involves a discussion of other natural forces that arise when two very smooth surfaces are brought together. Two attractive forces known to hold smooth surfaces together are Casimir forces and Van Der Waals forces. These forces are strong enough to hold the two electrodes of this invention together prior to applying a voltage, but they are not expected to be so strong as to affect the desired interaction and dominance of the electrostatic and magnetostatic forces as described during operation of the invention. However, these Casimir and Van Der Waals forces can assure that the two electrodes are in full surface contact prior to turning the device on with an applied voltage. In this case, the invention's operation merely needs to separate the two electrodes by a few nanometers. These Casimir and Van Der Waals forces also help eliminate the need for insulating layer 4 of FIG. 1, further simplifying the invention's design.

Multiples units of this device can be connected together in parallel and in series in order to achieve higher levels of energy conversion or to match voltages with the power supply or both.

Laboratory and Simulation Results

The electrode configuration of FIG. 8 was assembled in a microelectronics lab with copper as the foil backing, and this electrode pair was placed inside of a magnet structure like that shown in FIG. 11*b*. Thermocouples were attached to each electrode to produce a voltage that is proportional to temperature, and the entire apparatus was placed in a vacuum chamber that was pumped to 1E-3 Torr of vacuum pressure. When the electrode pair was activated by an external power supply with 1.1 amperes, a relative temperature difference of 3.0 degrees was observed between two electrodes, with the cooler side being the side that was emitting electrons. This same relative temperature difference observed as being removed when any of the following actions were taken: (1) replacement of vacuum with nitrogen at atmospheric pressure, (2) deactivation of the chip by disconnecting the external power supply, or (3) reversing the current flow to increase the attractive contact force between the electrodes instead of forming a gap. It is presumed that each of these three actions removed the thermo-tunneling effect. Computer simulations of the electromechanical system of this apparatus as well as observed electrical characteristics of the electrodes also were consistent with this design successfully creating a thermo-tunneling gap.

It should be emphasized that the above-described embodiments of the present device and process, particularly, and "preferred" embodiments, are merely possible examples of implementations and merely set forth for a clear understanding of the principles of the invention. Many different embodiments of the self-positioning electrode device described herein may be designed and/or fabricated without departing from the spirit and scope of the invention. All such modifications and variations are intended to be included herein within the scope of this disclosure and protected by the following claims. Therefore the scope of the invention is not intended to be limited except as indicated in the appended claims.

I claim:

1. A device characterized by comprising facing electrodes or electrode assemblies, wherein an attracting force distribution within the electrodes or electrode assemblies and an equal but opposite repelling force distribution generated by an electric current distribution within the electrodes or electrode assemblies in the presence of an applied magnetic field distribution, act simultaneously to establish a stable equilibrium separation of the two electrodes across their facing surfaces.

2. The device of claim 1, characterized by one or more of the following features:
   (a) wherein one or both of the facing electrodes is flexible;
   (b) wherein the surface of one or more electrodes is made of or coated with or has evaporated thereon, a low work function material, preferably a layered or other combination of a alkali metal, an alloy of an alkali metal, an oxide, diamond, or nanotubes, more preferably cesium, sodium, potassium, thorium, metal-coated oxide, a diamond film, silicon, germanium, an array of carbon nanotubes and a collection of oxide particles of nanometer dimensions, a thermoelectrically sensitive material, a plurality of peaks and valleys, a semiconductor resonator, a layered material having a resistive lower layer and an upper layer of a low work function, or a combination thereof;
   (c) further including a mechanically, magnetically, electrostatically, electromechanically, or electromagnetically created force, optionally formed from a distribution of springs or spongy material, offsetting deficiencies or excesses in the magnitude of said attracting and repelling magnetic forces;
   (d) further including a damping system for preventing vibrations or oscillations of either electrode around its equilibrium resting position;
   (e) wherein one or more of the electrodes are patterned or roughened with elevated and non-elevated areas to simultaneously reduce electrostatic forces and electrode resistive losses;
   (f) wherein a portion of one electrode has a coat of a non-conducting material on which another electrode may rest while the device is turned off;
   (g) wherein the electrodes are enclosed in a vacuum chamber;
   (h) wherein the electrodes are enclosed in a chamber filled with inert gas, preferably argon or nitrogen;
   (i) wherein one of the facing electrodes is formed into a spiral shape and the magnetic field runs in a radial direction from a center of the device, wherein the spiral shape preferably is of linearly increasing width or exponentially increasing width;
   (j) further including a heat source connected to the electrodes;
   (k) further including a power supply connected to the electrodes;
   (l) wherein the magnetic field strength decreases in a same direction as the current density increases in one or both electrodes in order to achieve uniform force distributions acting between the electrodes, wherein a proximity of magnetic material preferably is decreased in the direction that current density increases in one or both electrodes;
   (m) wherein the electrodes are arranged in multiple spaced layers.

3. The device of claim 1, wherein one or both of the electrodes are flexible, and characterized by one or more of the following features:
   (a) wherein the flexible electrode(s) comprise(s) a base material selected from a conductive metal, a layered metal/glass, a layered metal/plastic composite, and a semiconductor material;
   (b) wherein the flexible electrode(s) comprise(s) a base material selected from silicon, germanium, or gallium arsenide, or a conductive metal selected from the group consisting of gold, silver, aluminum, copper, and nickel optionally combined in layers with glass, polyimide, polyester, polyamide, polyacrylic, or polyolefin;
   (c) wherein the flexible electrode(s) is/are shaped to generate a current density distribution that combined with the magnetic field distribution generates a repelling force distribution that equals the attracting force distribution at or near a desired separation distance distribution between the electrodes, wherein a width of a surface of the flexible electrode(s) preferably increases exponentially from one end to the other end;
(d) wherein the flexible electrode(s) is/are wider at one end which wider end is fixedly mounted on a support structure;
(e) wherein the flexible electrode(s) is/are narrower at one end which narrower end rests on an insulating support when the device is turned off;
(f) wherein the flexible electrode(s) comprise(s) a metal foil mounted on a flexible plastic film; and
(g) wherein the strength of the magnetic field varies in inverse proportion to current density in the flexible electrode so as to achieve a constant force.

4. The device of claim 1, characterized by, further including a permanent magnet mounted on or near either electrode, wherein the permanent magnet:
(a) preferably is contained within or is part of one of the facing electrodes;
(b) preferably contains conducting ferromagnetic magnetic materials selected from iron, cobalt, nickel, neodymium and aluminum, or a combination thereof, and/or
(c) wherein one of the electrodes is formed of a permanent magnet containing non-conducting ferromagnetic materials coated with a conducting material.

5. A device characterized by comprising multiple units of the device of claim 1, assembled in series, or in parallel, or in parallel and in series.

6. A device characterized by comprising multiple devices of the device of claim 1, fabricated on a wafer or stack of wafers to achieve production efficiency or packaging density, or a combination of production efficiency and packaging density.

7. The device of any of claim 4, characterized in that the electrodes are placed on smaller heat sinks that are connected to a larger heat sink that accumulates heat flow into or out of multiple devices; wherein the smaller heat sinks preferably comprise fins running in a different planar direction from and connected to the larger heat sink.

8. The device of claim 1, characterized by one or more of the following features:
(a) including multiple permanent magnets and permeable ferromagnetic materials arranged to have voids containing a magnetic field that allows gaps to form in individual devices when they are turned on and have a current flowing, wherein the permanent magnets preferably are placed inside of a grating formed from permeable magnetic material to create an array of devices with a side for heat to flow into the array and a side for heat to flow out of the array;
(b) wherein the device is produced by micro electromechanical systems (MEMs) processes and design techniques;
(c) wherein one or both of the electrodes is created from an array of cantilevered structures fabricated from a combination of film growth and sacrificial layer removal on standard industry substrates;
(d) wherein the permanent magnet and/or permeable magnetic material is one of or an alloy of or a recombined sintering of iron, cobalt, nickel, chromium, platinum, aluminum, or neodymium;
(e) further including an electrical circuit that generates a gap-forming start-up current in the device creating a separation that can sustain a temperature difference between the two electrodes or electrode assemblies until the electron tunneling current can take over as the gap-creating current;
(f) wherein a low work-function layer is formed by including cesium or barium or a combination of cesium and barium in a vacuum package which creates a vapor that forms a monolayer, submonolayer, or multiple monolayers on one or both of the facing electrodes;
(g) wherein a compound of an alkali metal is attached to a filament that creates the presence of the alkali metal inside the container through heating, evaporation, and condensation, wherein the alkali metal preferably is cesium, more preferably cesium chromate, and wherein the filament connectors optionally are electrically routed through the doped silicon thermal sides to eliminate wire holes and feed-throughs, or are connected in parallel electrically within the device and is designed to open its circuit after the alkali metal is evaporated; and
(h) including a material that acts as a getter to remove unwanted gases at the time of production or subsequently, wherein the getter material preferably is selected from titanium, cesium, barium, sodium, potassium, and a combination thereof.

9. The device of claim 1, characterized in that the electrodes or electrode assemblies are contained in an evacuated container with two thermal paths leading into and out of the container.

10. The device of claim 9, characterized by one or more of the following features:
(a) wherein the two thermal paths are separated by glass, ceramic, or other material with low thermal conductivity;
(b) wherein the thermal path material is made of silicon, copper, aluminum or other material with high thermal conductivity;
(c) wherein the walls of the container are glass and the thermal paths are silicon, which are bonded together using a glass frit process to form the vacuum seal, wherein the silicon material preferably is highly doped to allow the electrical connections to the electrodes to flow through the silicon and eliminate the need for wire holes, feed-throughs, or similar connections to the interior of the container;
(d) wherein a soft thermal material with sufficient thermal conductivity is used to allow slight movement of the electrodes while simultaneously conducting heat to or from the electrodes, wherein the soft thermal material preferably is one of a liquid metal, a silicone-free polymer, a mixture containing carbon nano-tubes, a vacuum compatible grease, or a suspension of thermally conductive particles in a soft or liquid material;
(e) wherein the connecting wire to the electrode or electrode assembly is attached with solder, solder bumps, ultrasonic wire bonding, conductive epoxy, solder paste, or contact pressure.

11. A process for converting thermal energy to an electrical current or for converting electrical energy to refrigeration characterized by supplying a device of claim 1, and adjusting strengths of the magnetic field and the current distribution to place the facing electrodes in a stable, spaced apart, equilibrium position.

12. The process of claim 11, characterized by one or more of the following features:
(a) wherein the facing electrodes are spaced apart in the range of about 20 nanometers or less;
(b) wherein the strengths of the magnetic field and the current distribution are adjusted to place the facing electrodes in a stable, spaced apart, equilibrium position spaced in the range of 1 nanometer to 20 nanometers;

(c) wherein the strengths are adjusted to produce an electrode spacing in the range of 6 nanometers to 20 nanometers;
(d) wherein the strengths are adjusted to produce an electrode spacing in the range of 1-6 nanometers; and
(e) wherein the strengths produce an electrode spacing in the range of 20 nanometers to 1000 nanometers, preferably 20 nanometers to 100 nanometers, and one electrode has a photosensitive material for use in radiation conversion to electric power by primarily photon thermo-tunneling from the radiating electrode to the other, photosensitive electrode.

13. A process for converting heat to cooling or to electrical energy characterized by using the device of claim 1.

14. The process of claim 13, characterized by one or more of the following features:
(a) wherein the heat source is a radiation source, heat from the environment, geothermal energy, or heat generated from engines or animal metabolism;
(b) wherein the source of heat is a living human body;
(c) wherein the source of heat is living human body and the device is a hand held device;
(d) wherein the source of heat is a running electrical, steam or internal combustion engine, burning fuel, or their exhaust gases;
(e) wherein the source of heat is an internal combustion engine or its exhaust gases and the device is incorporated in the engine or gas exhaust line as a heat sink;
(f) wherein the device is operated at ambient temperatures; and
(g) wherein the device is used in a refrigerator, an air conditioner, a cooling blanket, cooling clothing, or a cooling device attached to or contained within a human or animal body.

15. A device characterized by comprising multiple units of the device of claim 3, assembled in series, or in parallel, or in parallel and in series.

16. A device characterized by comprising multiple devices of the device of claim 3, fabricated on a wafer or stack of wafers to achieve production efficiency or packaging density, or a combination of production efficiency and packaging density.

17. The device of claim 15, characterized in that the electrodes are placed on smaller heat sinks that are connected to a larger heat sink that accumulates heat flow into or out of multiple devices; wherein the smaller heat sinks preferably comprise fins running in a different planar direction from and connected to the larger heat sink.

18. The device of claim 3, characterized in that the electrodes or electrode assemblies are contained in an evacuated container with two thermal paths leading into and out of the container.

19. The device of claim 18, characterized by one or more of the following features:
(a) wherein the two thermal paths are separated by glass, ceramic, or other material with low thermal conductivity;
(b) wherein the thermal path material is made of silicon, copper, aluminum or other material with high thermal conductivity;
(c) wherein the walls of the container are glass and the thermal paths are silicon, which are bonded together using a glass frit process to form the vacuum seal, wherein the silicon material preferably is highly doped to allow the electrical connections to the electrodes to flow through the silicon and eliminate the need for wire holes, feed-throughs, or similar connections to the interior of the container;
(d) wherein a soft thermal material with sufficient thermal conductivity is used to allow slight movement of the electrodes while simultaneously conducting heat to or from the electrodes, wherein the soft thermal material preferably is one of a liquid metal, a silicone-free polymer, a mixture containing carbon nano-tubes, a vacuum compatible grease, or a suspension of thermally conductive particles in a soft or liquid material;
(e) wherein the connecting wire to the electrode or electrode assembly is attached with solder, solder bumps, ultrasonic wire bonding, conductive epoxy, solder paste, or contact pressure.

20. A process for converting thermal energy to an electrical current or for converting electrical energy to refrigeration characterized by supplying a device of claim 16, and adjusting strengths of the magnetic field and the current distribution to place the facing electrodes in a stable, spaced apart, equilibrium position.

21. The process of claim 20, characterized by one or more of the following features:
(a) wherein the facing electrodes are spaced apart in the range of about 20 nanometers or less;
(b) wherein the strengths of the magnetic field and the current distribution are adjusted to place the facing electrodes in a stable, spaced apart, equilibrium position spaced in the range of 1 nanometer to 20 nanometers;
(c) wherein the strengths are adjusted to produce an electrode spacing in the range of 6 nanometers to 20 nanometers;
(d) wherein the strengths are adjusted to produce an electrode spacing in the range of 1-6 nanometers; and
(e) wherein the strengths produce an electrode spacing in the range of 20 nanometers to 1000 nanometers, preferably 20 nanometers to 100 nanometers, and one electrode has a photosensitive material for use in radiation conversion to electric power by primarily photon thermo-tunneling from the radiating electrode to the other, photosensitive electrode.

22. A process for converting heat to cooling or to electrical energy characterized by using the device of claim 16.

23. The process of claim 22, characterized by one or more of the following features:
(a) wherein the heat source is a radiation source, heat from the environment, geothermal energy, or heat generated from engines or animal metabolism;
(b) wherein the source of heat is a living human body;
(c) wherein the source of heat is living human body and the device is a hand held device;
(d) wherein the source of heat is a running electrical, steam or internal combustion engine, burning fuel, or their exhaust gases;
(e) wherein the source of heat is an internal combustion engine or its exhaust gases and the device is incorporated in the engine or gas exhaust line as a heat sink;
(f) wherein the device is operated at ambient temperatures; and
(g) wherein the device is used in a refrigerator, an air conditioner, a cooling blanket, cooling clothing, or a cooling device attached to or contained within a human or animal body.

24. A device characterized by comprising multiple units of the device of claim 4, assembled in series, or in parallel, or in parallel and in series.

25. A device characterized by comprising multiple devices of the device of claim 4, fabricated on a wafer or stack of wafers to achieve production efficiency or packaging density, or a combination of production efficiency and packaging density.

26. The device of claim 24, characterized in that the electrodes are placed on smaller heat sinks that are connected to a larger heat sink that accumulates heat flow into or out of multiple devices; wherein the smaller heat sinks preferably comprise fins running in a different planar direction from and connected to the larger heat sink.

27. The device of claim 4, characterized in that the electrodes or electrode assemblies are contained in an evacuated container with two thermal paths leading into and out of the container.

28. The device of claim 27, characterized by one or more of the following features:
  (a) wherein the two thermal paths are separated by glass, ceramic, or other material with low thermal conductivity;
  (b) wherein the thermal path material is made of silicon, copper, aluminum or other material with high thermal conductivity;
  (c) wherein the walls of the container are glass and the thermal paths are silicon, which are bonded together using a glass frit process to form the vacuum seal,
wherein the silicon material preferably is highly doped to allow the electrical connections to the electrodes to flow through the silicon and eliminate the need for wire holes, feed-throughs, or similar connections to the interior of the container;
  (d) wherein a soft thermal material with sufficient thermal conductivity is used to allow slight movement of the electrodes while simultaneously conducting heat to or from the electrodes, wherein the soft thermal material preferably is one of a liquid metal, a silicone-free polymer, a mixture containing carbon nano-tubes, a vacuum compatible grease, or a suspension of thermally conductive particles in a soft or liquid material;
  (e) wherein the connecting wire to the electrode or electrode assembly is attached with solder, solder bumps, ultrasonic wire bonding, conductive epoxy, solder paste, or contact pressure.

29. A process for converting thermal energy to an electrical current or for converting electrical energy to refrigeration characterized by supplying a device of claim 25, and adjusting strengths of the magnetic field and the current distribution to place the facing electrodes in a stable, spaced apart, equilibrium position.

30. The process of claim 29, characterized by one or more of the following features:
  (a) wherein the facing electrodes are spaced apart in the range of about 20 nanometers or less;
  (b) wherein the strengths of the magnetic field and the current distribution are adjusted to place the facing electrodes in a stable, spaced apart, equilibrium position spaced in the range of 1 nanometer to 20 nanometers;
  (c) wherein the strengths are adjusted to produce an electrode spacing in the range of 6 nanometers to 20 nanometers;
  (d) wherein the strengths are adjusted to produce an electrode spacing in the range of 1-6 nanometers; and
  (e) wherein the strengths produce an electrode spacing in the range of 20 nanometers to 1000 nanometers, preferably 20 nanometers to 100 nanometers, and one electrode has a photosensitive material for use in radiation conversion to electric power by primarily photon thermo-tunneling from the radiating electrode to the other, photosensitive electrode.

31. A process for converting heat to cooling or to electrical energy characterized by using the device of claim 25.

32. The process of claim 31, characterized by one or more of the following features:
  (a) wherein the heat source is a radiation source, heat from the environment, geothermal energy, or heat generated from engines or animal metabolism;
  (b) wherein the source of heat is a living human body;
  (c) wherein the source of heat is living human body and the device is a hand held device;
  (d) wherein the source of heat is a running electrical, steam or internal combustion engine, burning fuel, or their exhaust gases;
  (e) wherein the source of heat is an internal combustion engine or its exhaust gases and the device is incorporated in the engine or gas exhaust line as a heat sink;
  (f) wherein the device is operated at ambient temperatures; and
  (g) wherein the device is used in a refrigerator, an air conditioner, a cooling blanket, cooling clothing, or a cooling device attached to or contained within a human or animal body.

* * * * *